United States Patent
You et al.

(10) Patent No.: US 12,349,175 B2
(45) Date of Patent: Jul. 1, 2025

(54) OPERATION METHOD OF DU OF PARENT NODE COMMUNICATING WITH MT OF IAB NODE IN WIRELESS COMMUNICATION SYSTEM, AND DEVICE USING METHOD

(71) Applicant: LG ELECTRONICS INC., Seoul (KR)

(72) Inventors: Hyangsun You, Seoul (KR); Joonkui Ahn, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 214 days.

(21) Appl. No.: 17/801,415

(22) PCT Filed: Mar. 5, 2021

(86) PCT No.: PCT/KR2021/002719
§ 371 (c)(1),
(2) Date: Aug. 22, 2022

(87) PCT Pub. No.: WO2021/177767
PCT Pub. Date: Sep. 10, 2021

(65) Prior Publication Data
US 2023/0108413 A1  Apr. 6, 2023

(30) Foreign Application Priority Data
Mar. 5, 2020 (KR) .................. 10-2020-0027692

(51) Int. Cl.
*H04W 72/50* (2023.01)
*H04B 7/06* (2006.01)
*H04W 76/15* (2018.01)

(52) U.S. Cl.
CPC ............ *H04W 72/535* (2023.01); *H04B 7/06* (2013.01); *H04W 76/15* (2018.02)

(58) Field of Classification Search
CPC ....... H04W 72/535; H04W 76/15; H04B 7/06
(Continued)

(56) References Cited

U.S. PATENT DOCUMENTS 11,838,886 B2 * 12/2023 Wei ................... H04W 72/0446
2019/0350023 A1   11/2019 Novlan et al.
2020/0059879 A1   2/2020 Nam et al.

FOREIGN PATENT DOCUMENTS

EP            4014399         6/2022
KR    10-2020-0016814         2/2020
(Continued)

OTHER PUBLICATIONS

R1-1908987, "Mechanisms for resource multiplexing among backhaul and access links", source: Nokia, Nokia Shanghai Bell, 3GPP TSG RAN WG1 Meeting #98, Prague, Czech Republic, Aug. 26-30, 2019 (Year: 2019).*
(Continued)

*Primary Examiner* — Intekhaab A Siddiquee
(74) *Attorney, Agent, or Firm* — LEE, HONG, DEGERMAN, KANG & WAIMEY

(57) ABSTRACT

Provided are an operation method performed by a first distributed unit (DU) of a first parent node communicating with a mobile terminal (MT) of an IAB node in a wireless communication system, and a device using the method. The first parent node acquires first configuration information about the first DU, acquires second configuration information about a second DU of a second parent node communicating with the MT, and restricts, on the basis of the first configuration information and the second configuration information, downlink transmission or uplink reception operations of the first DU if predetermined conditions are satisfied.

3 Claims, 41 Drawing Sheets

(58) Field of Classification Search
USPC .......................................................... 370/329
See application file for complete search history.

(56) References Cited

FOREIGN PATENT DOCUMENTS

| WO | 2017026400 | 2/2017 |
|---|---|---|
| WO | 2019194737 | 10/2019 |
| WO | 2019208994 | 10/2019 |
| WO | 2020027713 | 2/2020 |
| WO | 2021028015 | 2/2021 |

OTHER PUBLICATIONS

R2-2000526, "Correction of TS 37.340 on the support of MR-DC for IAB", source: Huawei, HiSilicon, 3GPP TSG-RAN WG2 Meeting #109 electronic, Feb. 24-Mar. 6, 2020 (Year: 2020).*

R1-2000797, Maintenance of Rel-16 IAB Resource Multiplexing, source: Nokia, Nokia Shanghai Bell, 3GPP TSG RAN WG1 Meeting #100, e-Meeting, Feb. 24-Mar. 6, 2020 (Year: 2020).*

R1-2001160, Summary #2 of 7.2.3.3—Mechanisms for resource multiplexing among backhaul and access links, source: AT&T, 3GPP TSG-RAN WG1 Meeting #100-e e-Meeting, Feb. 24-Mar. 6, 2020. (Year: 2020).*

AT&T, "Summary #2 of 7.2.3.3—Mechanisms for resource multiplexing among backhaul and access links," 3GPP TSG-RAN WG1 Meeting #100-e, R1-2001160, Feb. 2020, 20 pages.

Nokia, Nokia Shanghai Bell, "Maintenance of Rel-16 IAB Resource Multiplexing," 3GPP TSG-RAN WG1 Meeting #100, R1-2000797, Feb. 2020, 10 pages.

Huawei, HiSilicon, "Correction of TS 37.340 on the support of MR-DC for IAB," 3GPP TSG-RAN WG2 Meeting #109, Electronic, R2-2000526, Feb. 2020, 8 pages.

PCT International Application No. PCT/KR2021/002719, International Search Report dated Jun. 17, 2021, 4 pages.

Japan Patent Office Application No. 2022-552883, Office Action dated Aug. 29, 2023, 2 pages.

Nokia et al., "Mechanisms for resource multiplexing among backhaul and access links," 3GPP TSG RAN WG1 Meeting #98, R1-1908987, Aug. 2019, 20 pages.

LG Electronics Inc., "Discussions on IAB resource multiplexing enhancements," 3GPP TSG RAN WG1 #105-e, R1-2105493, May 2021, 9 pages.

Nokia et al., "Half-duplex operation in CA based on [95-NR-06]," 3GPP TSG RAN WG1 Meeting #99, R1-1912282, Nov. 2019, 6 pages.

European Patent Office Application Serial No. 21764052.3, Search Report dated Mar. 4, 2024, 4 pages.

Huawei et al., "Key points on IAB enhancements," 3GPP TSG RAN Meeting #86, RP-192795, Dec. 2019, 2 pages.

LG Electronics Inc., "Discussions on access and backhaul link multiplexing and timing," 3GPP TSG RAN WG1 Meeting #95, R1-1812566, Nov. 2018, 5 pages.

The State Intellectual Property Office of the People's Republic of China Application Serial No. 202180018004.0, Office Action dated Nov. 25, 2024, 8 pages.

Ericsson, "Functional split between IAB node and other network nodes", R3-181311, 3GPP TSG-RAN WG3 #99, Mar. 2018, 6 pages.

* cited by examiner

OPERATION METHOD OF DU OF PARENT NODE COMMUNICATING WITH MT OF IAB NODE IN WIRELESS COMMUNICATION SYSTEM, AND DEVICE USING METHOD

CROSS-REFERENCE TO RELATED APPLICATIONS

This application is the National Stage filing under 35 U.S.C. 371 of International Application No. PCT/KR2021/002719, filed on Mar. 5, 2021, which claims the benefit of earlier filing date and right of priority to Korean Application No. 10-2020-0027692, filed on Mar. 5, 2020, the contents of which are all incorporated by reference herein in their entirety.

BACKGROUND OF THE DISCLOSURE

Field of the Disclosure

The present disclosure relates to an operating method of a distributed unit (DU) of a parent node that communicates with a mobile terminal (MT) of an IAB node in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, massive MIMO or multi-beam may be used, and a very large bandwidth is expected to be available compared to LTE, and the development and deployment of integrated access and backhaul (IAB) nodes is also expected.

An IAB node may be a node that supports a wireless connection with a terminal like a repeater based on a wireless backhaul (connection with a parent node or a donor node) supporting multi-hop. The IAB node may include a distributed unit (DU) and a mobile terminal (MT). Here, the DU may be a part that provides a connection to a terminal or other IAB node, and the MT may be a part that provides a connection to a parent node or a donor node.

The IAB node may support dual connectivity (DC). DC may refer to a technology in which an IAB node simultaneously uses radio resources provided by a plurality of base stations (or parent nodes).

Two parent nodes to which an IAB node is connected by dual connection can set different resource directions for the same resource. For example, the first parent node may set the specific resource to the downlink, but the second parent node may set the specific resource to the uplink. In this case, it is necessary to define how the first parent node, the second parent node and the IAB node should operate.

SUMMARY OF THE DISCLOSURE

An object of the present disclosure is to provide an operating method of a distributed unit (DU) of a parent node that communicates with a mobile terminal (MT) of an IAB node, and an apparatus using the method.

In one aspect, provided is an operating method performed by a first distributed unit (DU) of a first parent node communicating with a mobile terminal (MT) of an IAB node in a wireless communication system. The method includes obtaining first configuration information for the first DU, obtaining second configuration information for a second DU of a second parent node communicating with the MT and based on the first configuration information and the second configuration information, restricting a downlink transmission or an uplink reception of the first DU.

In another aspect, provided is a first distributed unit (DU) of a first parent node communicating with a mobile terminal (MT) of an IAB node. The first DU comprises a transceiver, at least one memory and at least one processor operatively coupled with the at least one memory and the transceiver. The processor is configured to: obtain first configuration information for the first DU, obtain second configuration information for a second DU of a second parent node communicating with the MT and based on the first configuration information and the second configuration information, restrict a downlink transmission or an uplink reception of the first DU.

In still another aspect, provided is an apparatus of a first distributed unit (DU) of a first parent node communicating with a mobile terminal (MT) of an IAB node. The apparatus includes at least one memory and at least one processor operatively coupled with the at least one memory. The processor is configured to: obtain first configuration information for the first DU, obtain second configuration information for a second DU of a second parent node communicating with the MT and based on the first configuration information and the second configuration information, restrict a downlink transmission or an uplink reception of the first DU.

In still another aspect, provided is at least one computer readable medium (CRM) having an instruction to be executed by at least one processor to perform operations includes: obtaining first configuration information for a first distributed unit (DU) of a first parent node communicating with a mobile terminal (MT) of an IAB node, obtaining second configuration information for a second DU of a second parent node communicating with the MT and based on the first configuration information and the second configuration information, restricting a downlink transmission or an uplink reception of the first DU.

In still another aspect, provided is a method for operating of a wireless communication system comprising a first distributed unit (DU) of a first parent node and a mobile terminal (MT) of an IAB node. The method includes obtaining, by the first DU, first configuration information for the first DU, obtaining, by the first DU, second configuration information for a second DU of a second parent node communicating with the MT and based on the first configuration information and the second configuration information, receiving, by the MT, a signal transmitted by the first DU or receiving, by the first DU, a signal transmitted by the MT. Based on the first configuration information and the second configuration information, based on that it is determined that the first DU and the second DU are configured to perform simultaneous operations not supported by the MT on a specific resource, the first DU restricts an operation according to the first configuration information.

When an IAB node is connected to two parent nodes in a DC method, if the two parent nodes are scheduled to perform simultaneous operations that the IAB node does not support in a specific resource, one parent node does not operate and only the other parent node works. As a result, it is possible to prevent simultaneous operations not supported by the IAB node from occurring.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
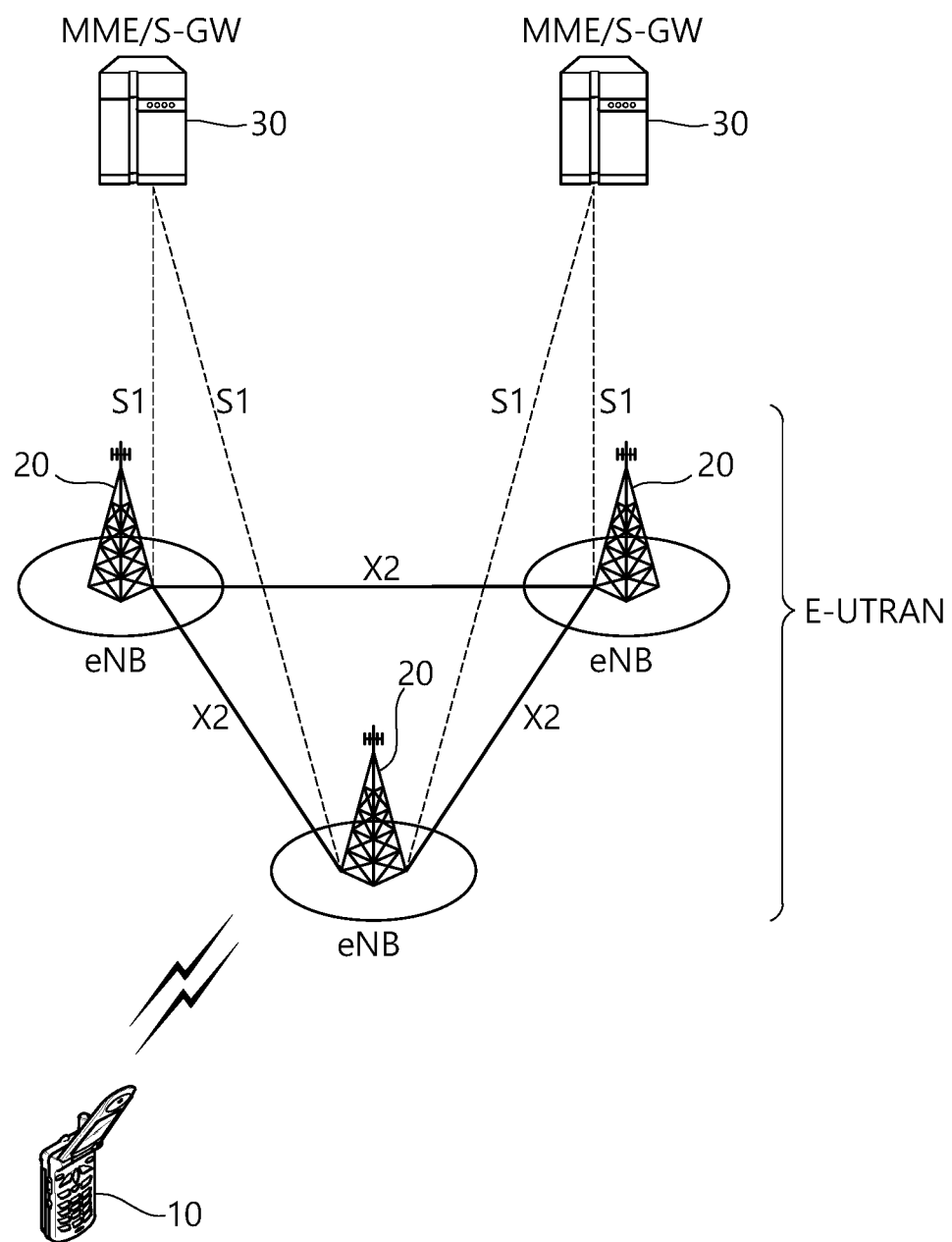
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
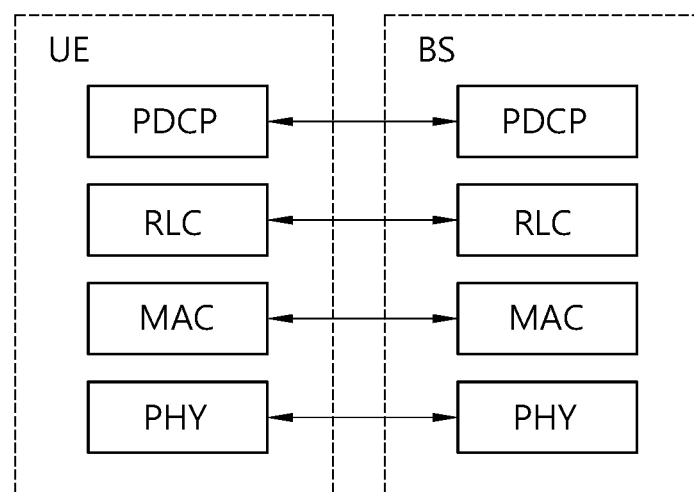
FIG. 2 is a diagram showing a wireless protocol architecture for a user plane.
Figure 3:
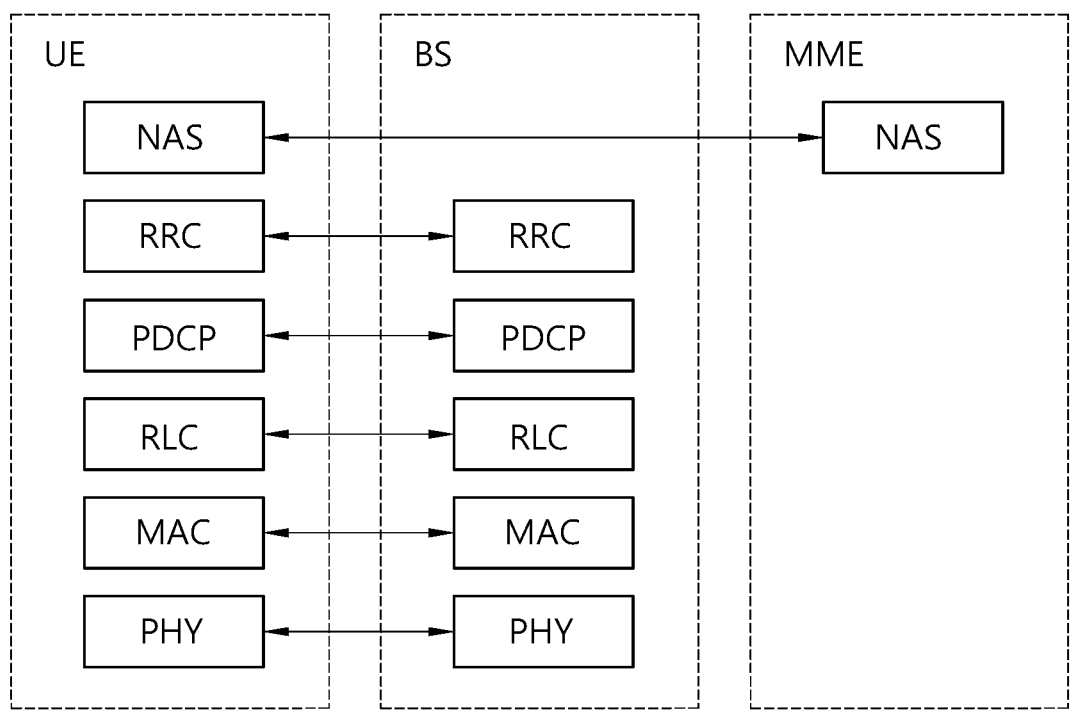
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QOS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
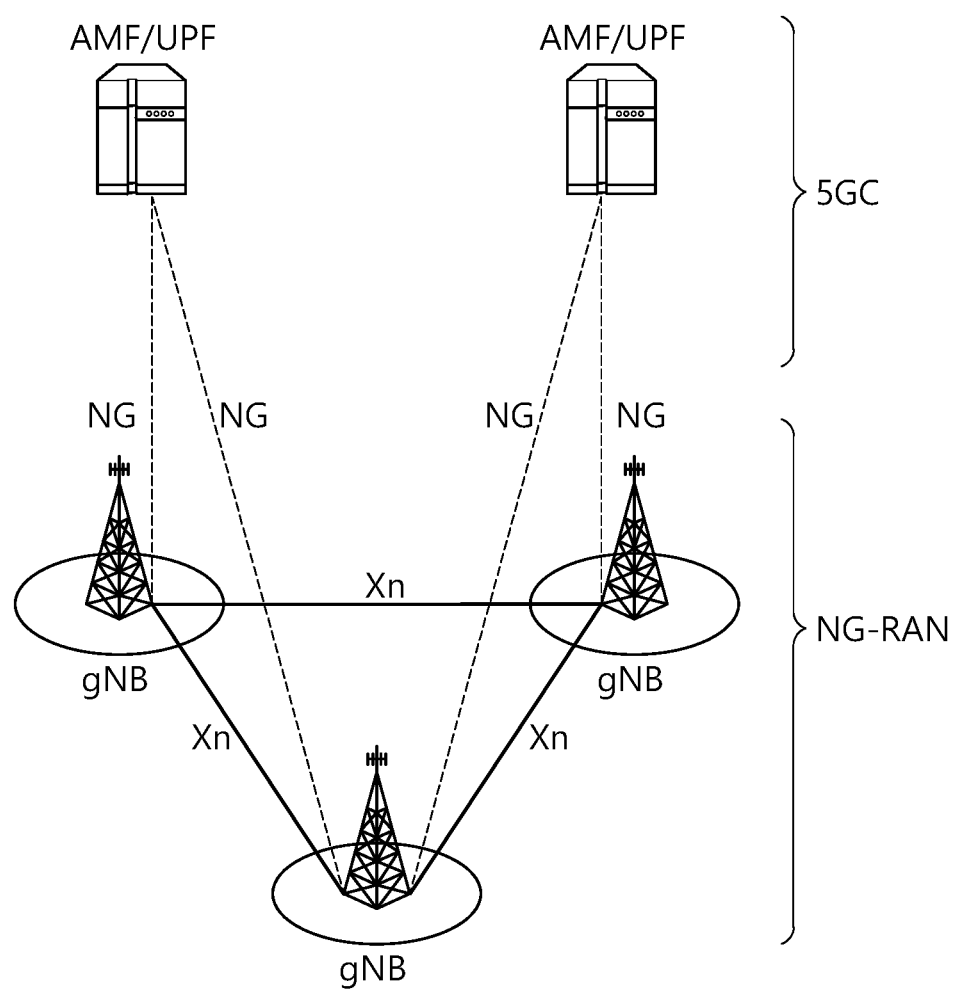
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
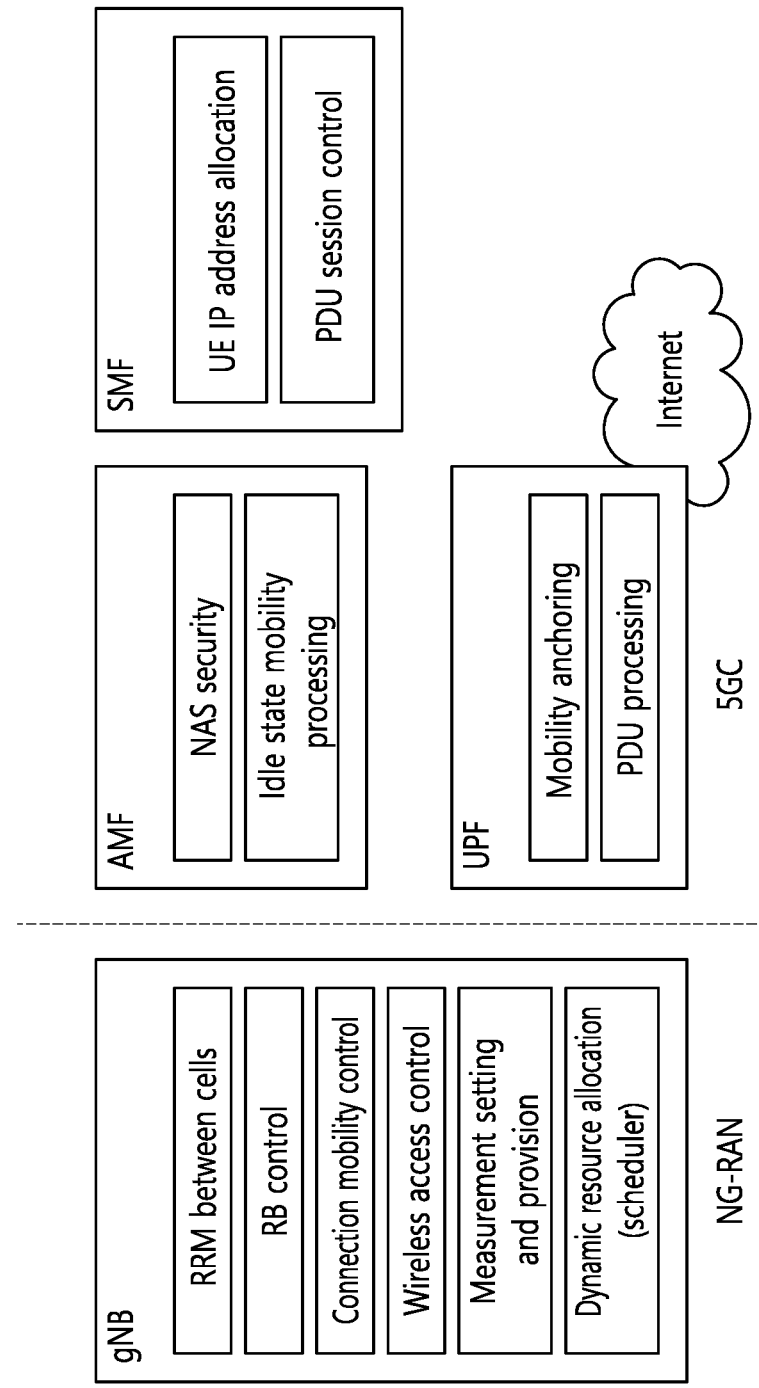
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
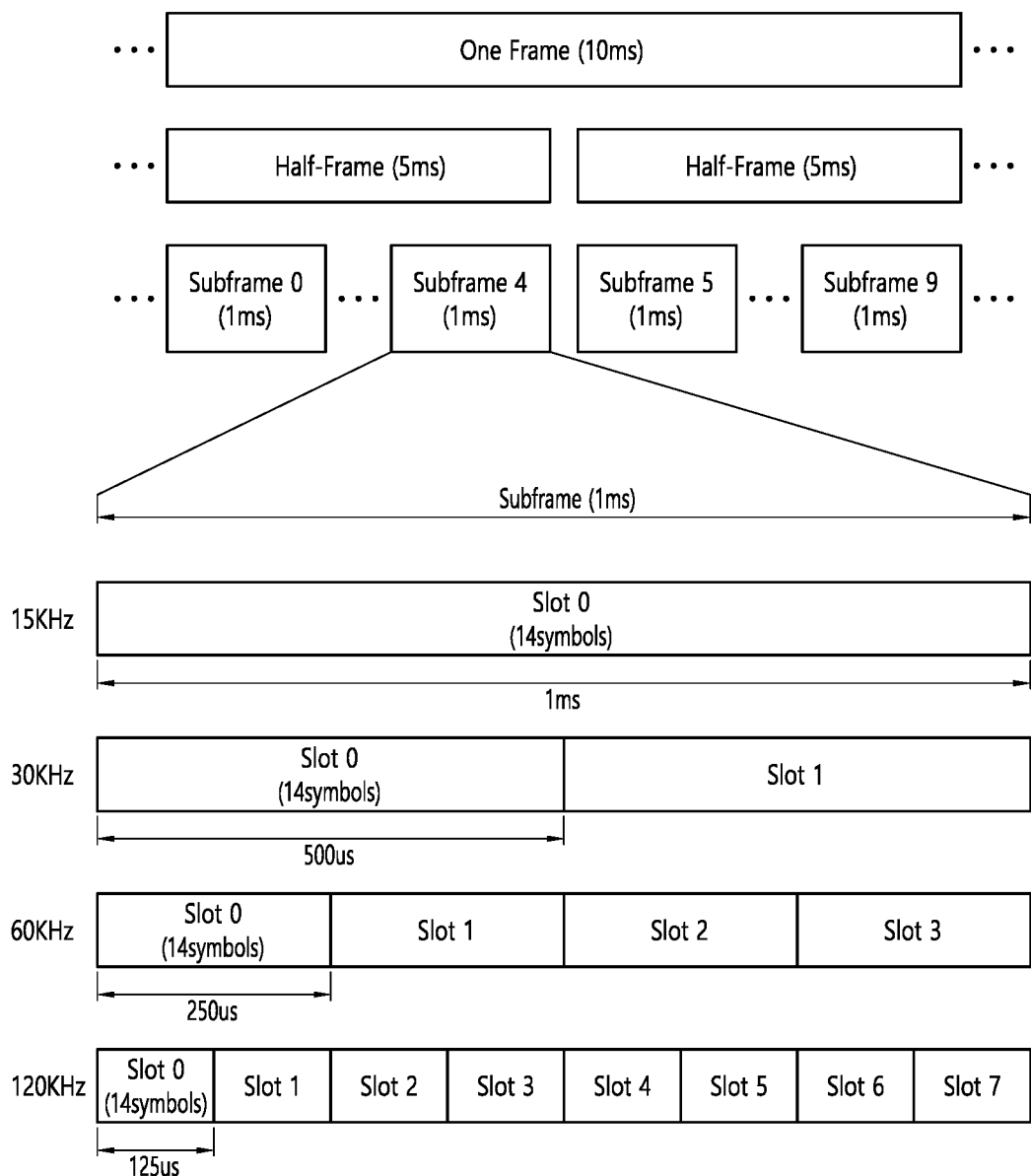
FIG. 6 illustrates an example of a frame structure that may be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM (A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration u.

TABLE 1

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations u.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 2-continued

| μ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |

FIG. 6 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| μ | $N^{slot}_{symb}$ | $N^{frame,u}_{slot}$ | $N^{subframe,u}_{slot}$ |
|---|---|---|---|
| 2 | 12 | 40 | 4 |

In an NR system, OFDM (A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
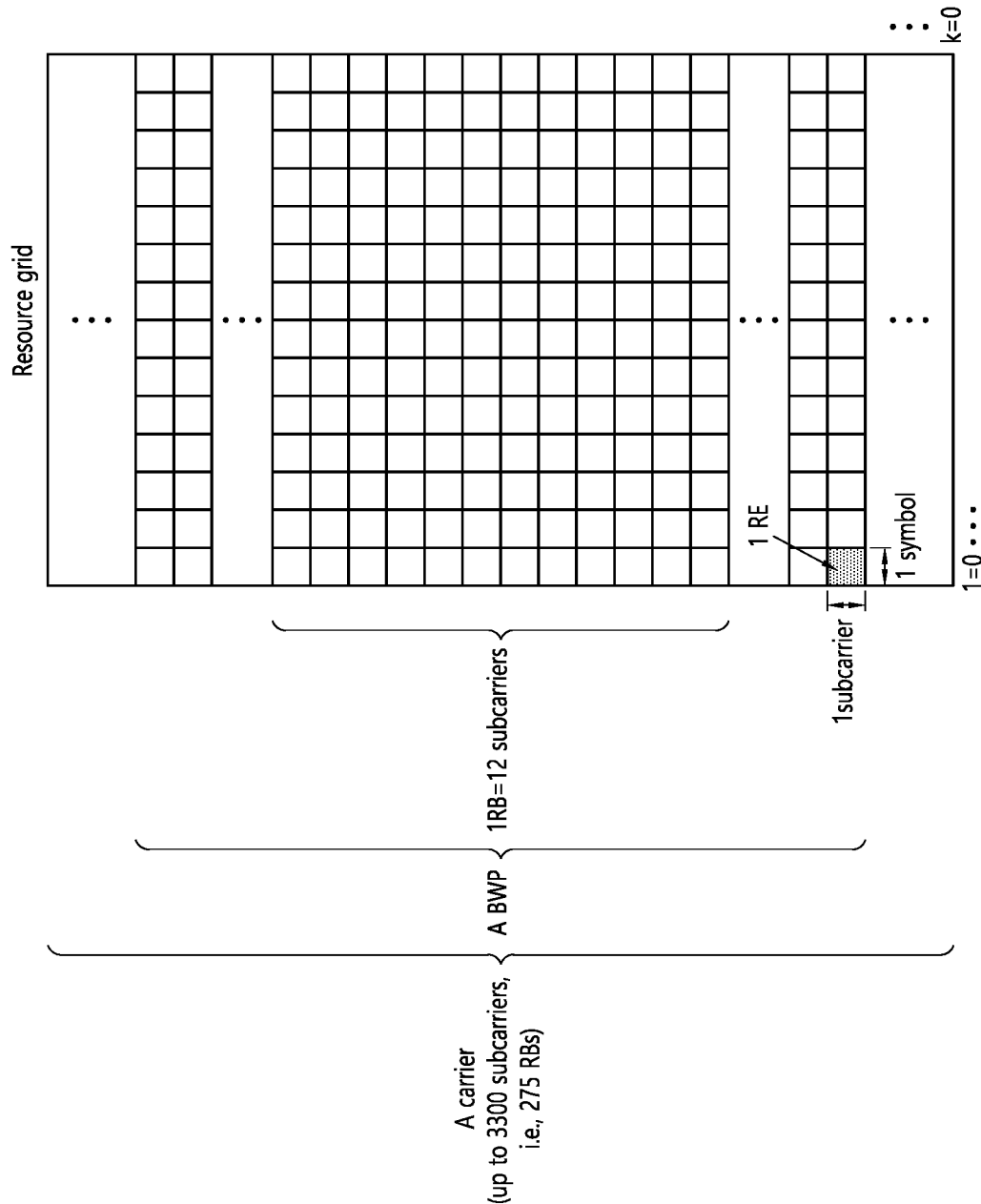
FIG. 7 illustrates a slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
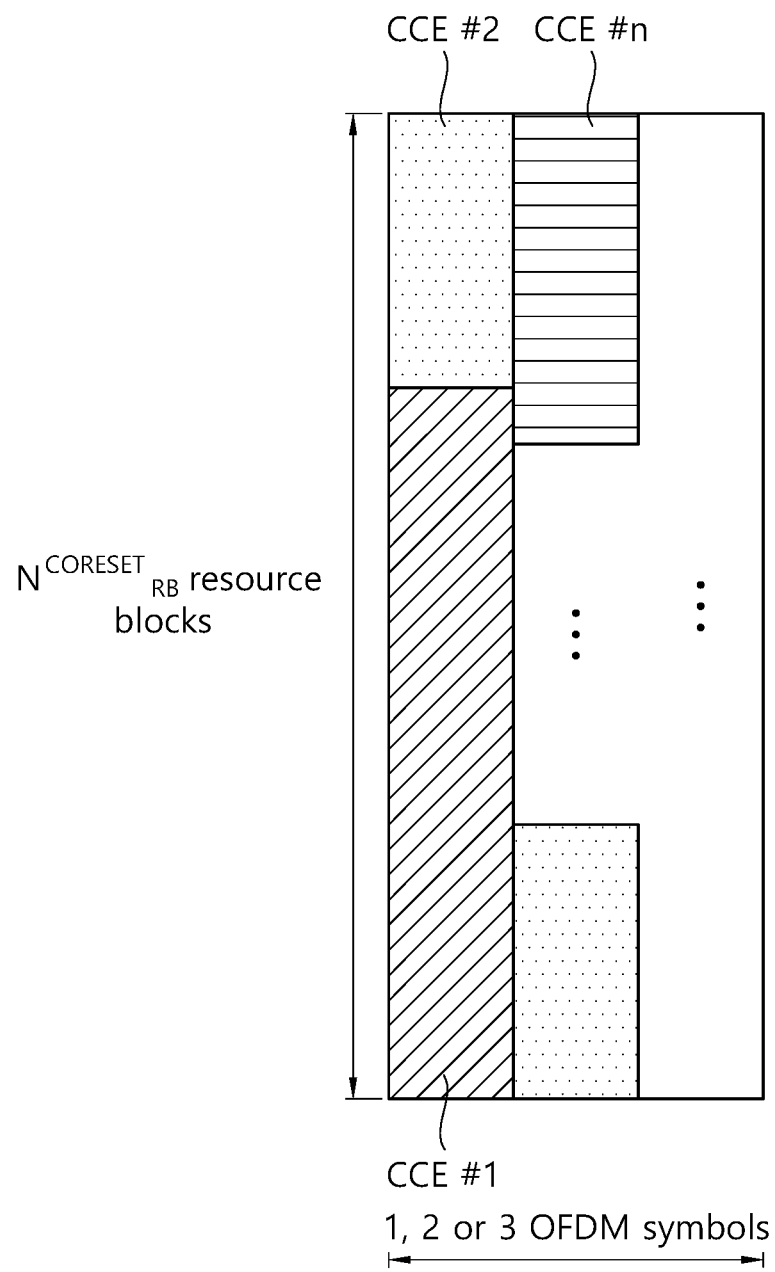
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
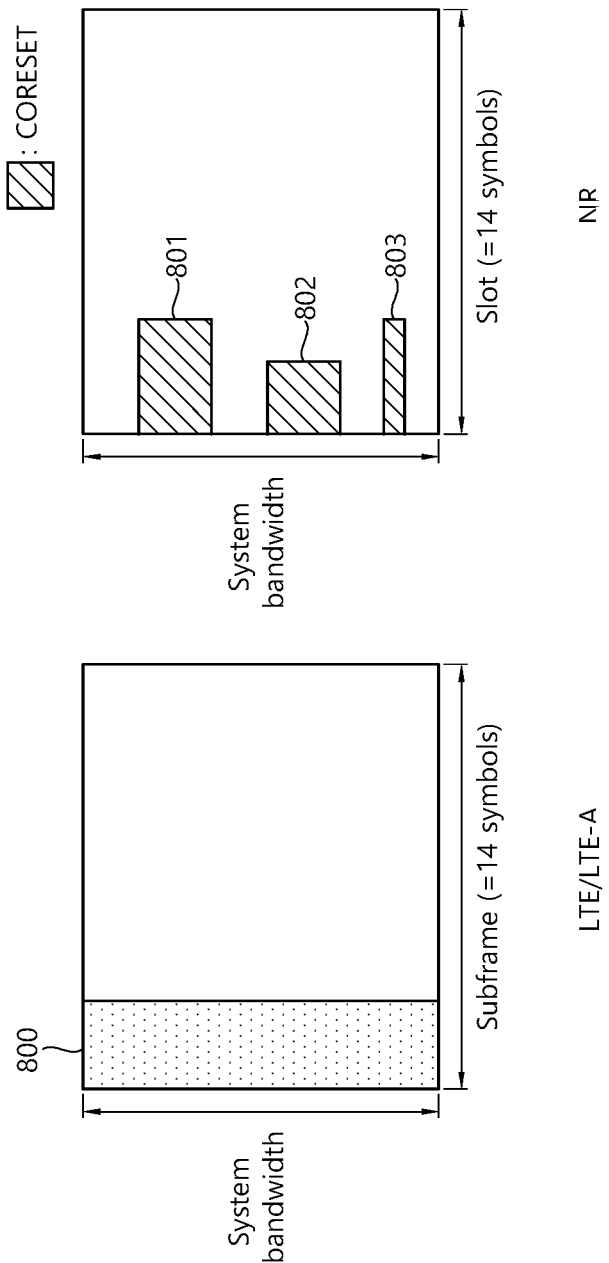
FIG. 9 is a diagram illustrating a difference between a related art control region and the CORESET in NR.

FIG. 9 is a diagram illustrating a difference between a related art control region and the CORESET in NR.

Referring to FIG. 9, a control region 800 in the related art wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
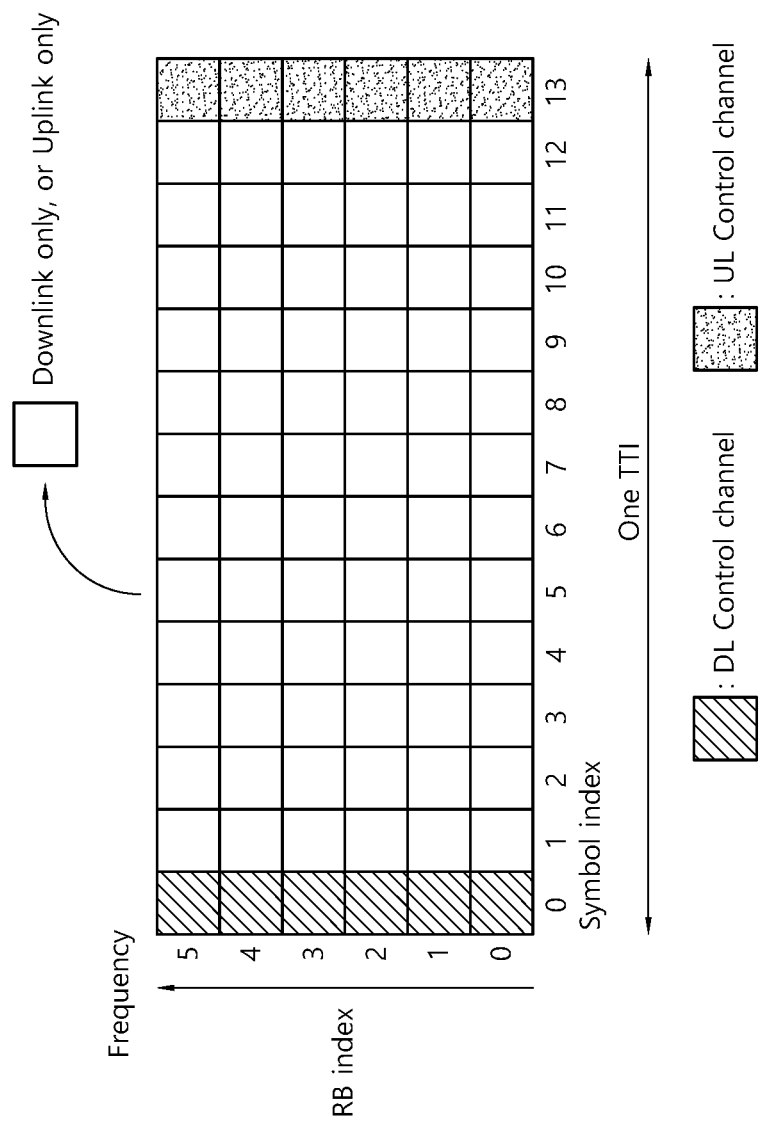
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission.

This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
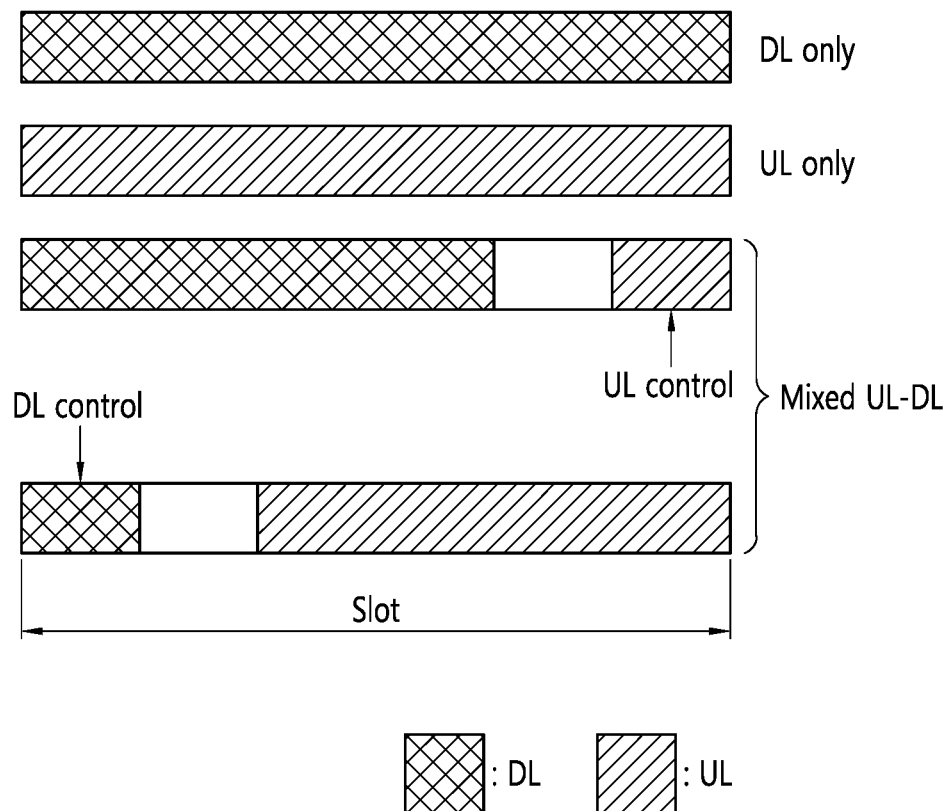
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell),
2) PDCCH DM-RS scrambling sequence initialization value,
3) Duration of a CORESET in the time domain (which may be given in symbol units),
4) Resource block set,
5) CCE-to-REG mapping parameter,
6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'),
7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |

TABLE 4-continued

| QCL Type | Description |
| --- | --- |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s ($0 \le s < 40$), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
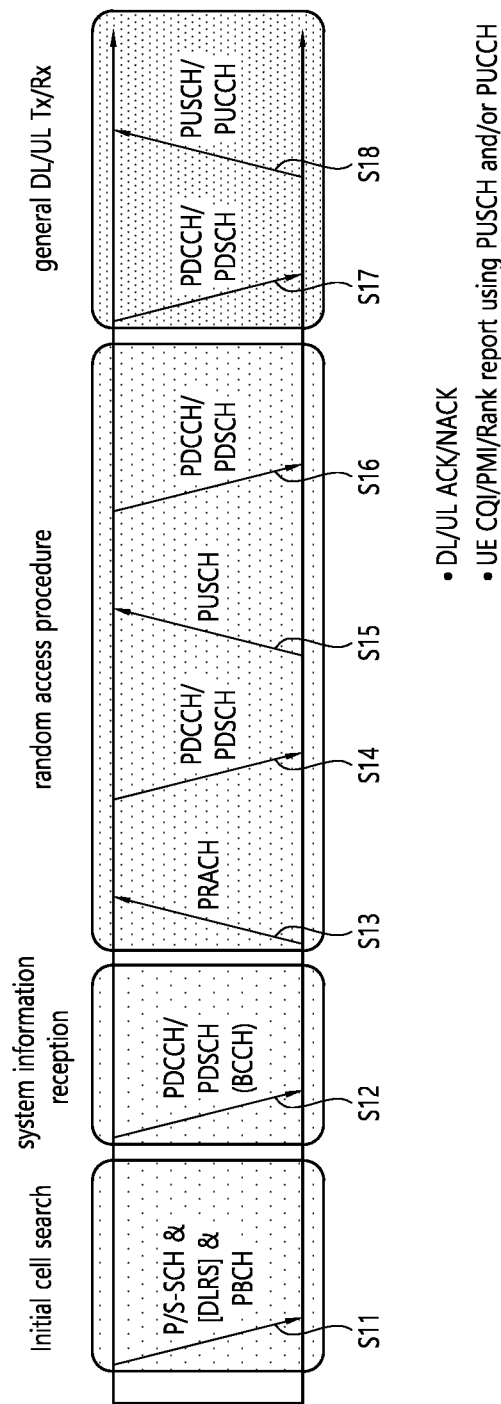
FIG. 12 illustrates physical channels and typical signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/ physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/ instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires. Hereinafter, an integrated access and backhaul link (IAB) will be described.

Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, occasions are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Technical features that are individually described in one drawing in this specification may be implemented individually or simultaneously.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
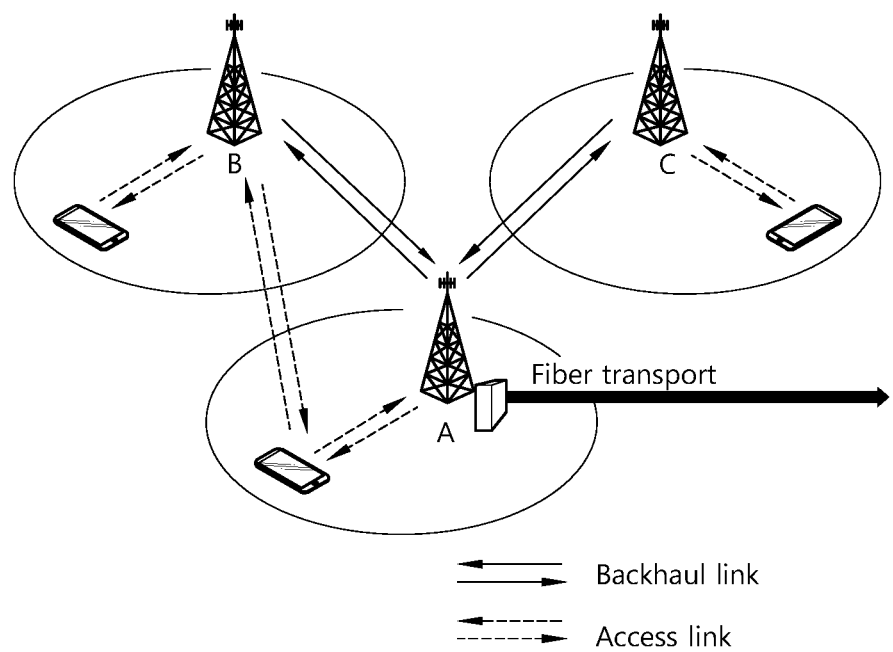
FIG. 13 schematically illustrates an example for a network with integrated access and backhaul links (IAB).

FIG. 13 schematically illustrates an example for a network with integrated access and backhaul links (IAB).

According to FIG. 13, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Efficient support of out-of-band relays may be important for some NR deployment scenarios. Close interworking with access links operating on the same frequency to accommodate duplex restrictions and avoid/mitigate interference is also very important.

Furthermore, operating the NR system in the millimeter wave spectrum may have problems such as severe short-term blocking that cannot be easily mitigated by the current RRC-based handover mechanism. Overcoming the short-term blocking in mmWave systems may require a fast RAN-based mechanism for switching between rTRPs that does not necessarily require the inclusion of a core network. It may also be necessary to develop an integrated framework that allows for fast switching of over-access and backhaul links. Over-the-air (OTA) coordination between rTRPs may also be considered to mitigate interference and support end-to-end path selection and optimization.

Addressing the following requirements in relation to IAB in NR may be necessary.

Efficient and flexible operation for in-band and out-of-band relaying in indoor and outdoor scenarios
Multi-hop and redundant connections
End-to-end path selection and optimization
Support of backhaul links with high spectral efficiency
Support of legacy NR UEs Legacy NR is designed to support half-duplex devices. Thus, half-duplex is supported and deserves to be targeted in the IAB scenario. Furthermore, IAB devices having a full duplex may also be considered.

In the IAB scenario, if each relay node (RN) does not have the scheduling capability, the donor gNB (DgNB) must schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 14:
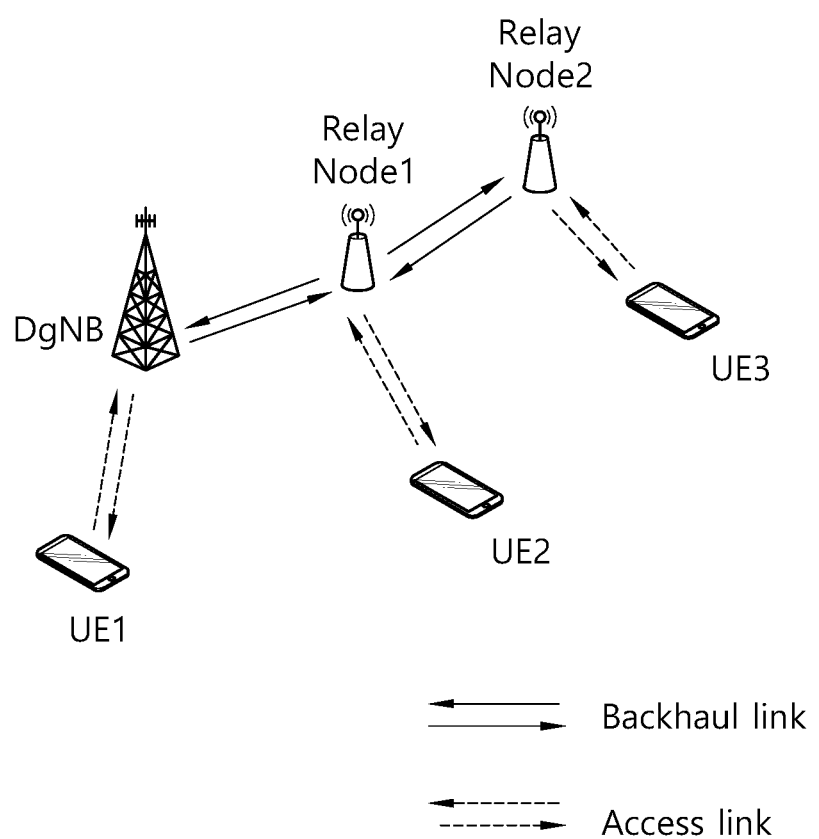
FIG. 14 schematically illustrates an example of the configuration of access and backhaul links.

FIG. 14 schematically illustrates an example of the configuration of access and backhaul links.

FIG. 14 illustrates an example in which a backhaul link and an access link are configured when DgNB and IAB relay nodes (RNs) exist. The DgNB, relay node 1, and relay node 2 are connected to a backhaul link, and UEs 1, 2, and 3 are sequentially connected to the DgNB, relay node 1, and relay node 2 through the access link.

The DgNB may make a scheduling decision of two backhaul links and three access links, and inform the scheduling results. Such centralized scheduling may include scheduling delays and cause latency issues.

If each relay node has a scheduling capability, distributed scheduling may be performed. Then, immediate scheduling of the uplink scheduling request of the UE can be performed, and the backhaul/access links can be used more flexibly by reflecting the surrounding traffic conditions.

Figure 15:
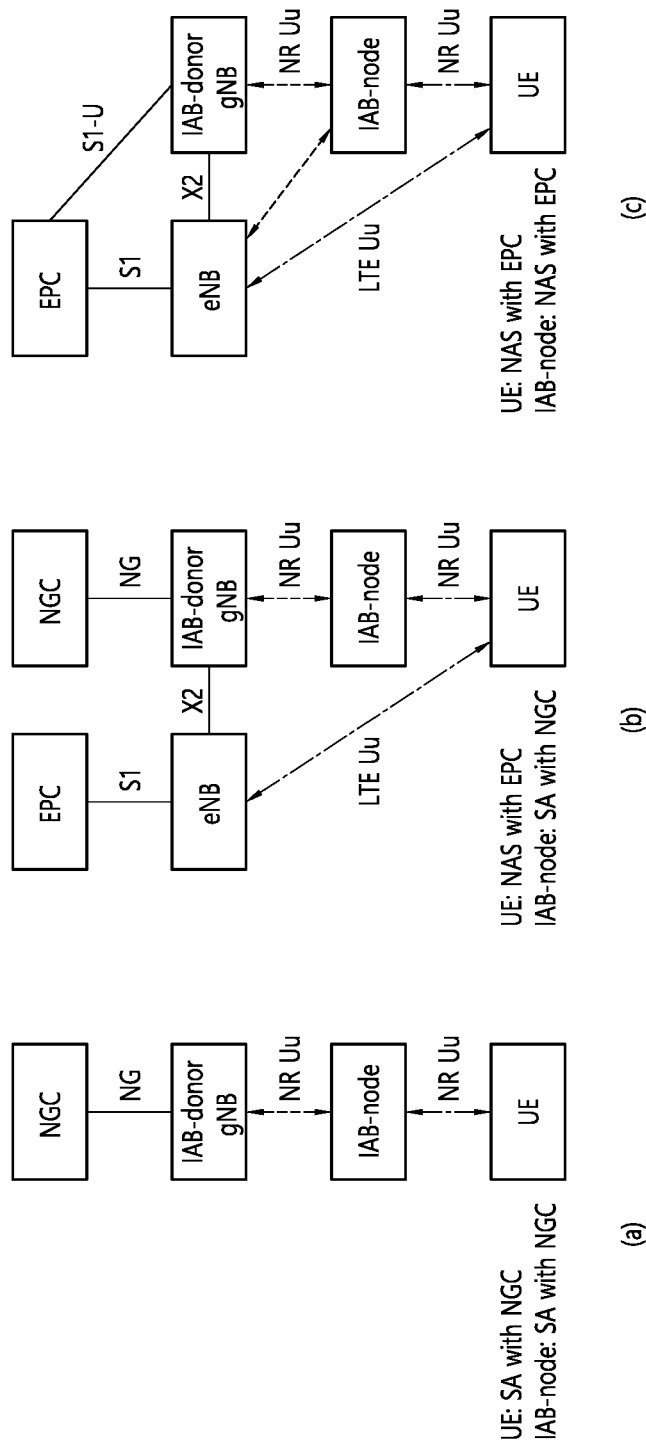
FIG. 15 illustrates the IAB node operating in stand alone (SA) mode or non-stand alone (NSA).

FIG. 15 illustrates that the IAB node operates in stand alone (SA) mode or non-stand alone (NSA).

FIG. 15 (a) illustrates that both the UE and the IAB node operate in SA mode in relation to the NGC, FIG. 15 (b) illustrates that the UE operates in the NSA mode in relation to the EPC while the IAB node operates in the SA mode in the relation with the NGC, and FIG. 15 (c) illustrates that both the UE and the IAB node operate in the NSA mode in relation to the EPC.

That is, the IAB node may operate in SA mode or NSA mode. When operating in NSA mode, the IAB node uses only the NR link for backhauling. A UE connecting to the IAB node may select an operation mode different from that of the IAB node. The UE may additionally connect to a different type of core network than the connected IAB node. IAB nodes operating in NSA mode may be connected to the same or different eNBs. A UE operating in the NSA node may connect to the same or different eNB as the connected IAB node.

Figure 16:
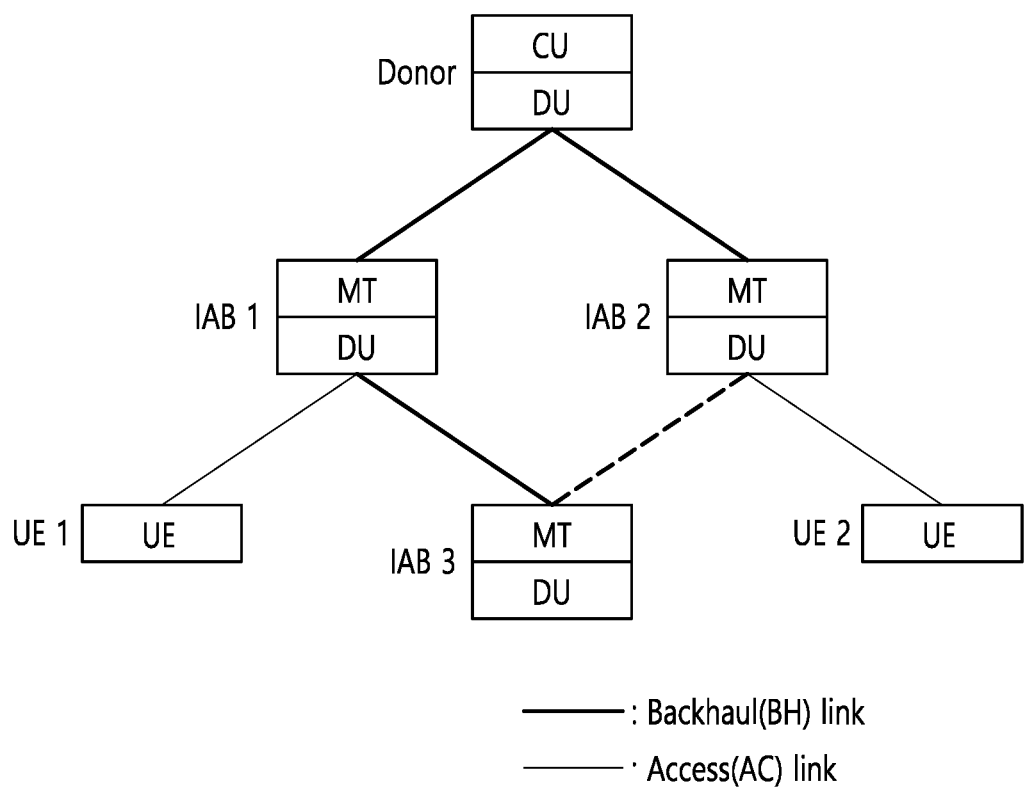
FIG. 16 illustrates a backhaul link and an access link.

FIG. 16 illustrates a backhaul link and an access link.

Referring to FIG. 16, a link between a donor node (which may be referred to as a parent node) and an IAB node or a link between IAB nodes is called a backhaul link. On the other hand, the link between the donor node and the UE or the link between the IAB node and the UE is called an access link. Specifically, the link between the MT of the IAB node and the DU of the parent node or the link between the DU of the IAB node and the MT of the child node of the IAB node is called a backhaul link, and the link between the DU of the IAB node and the UE may be referred to as an access link.

For communication with the parent node, the IAB node may be provided with an MT configuration indicating link direction information on a backhaul link between the parent node and itself. In addition, for communication with the child node, the IAB node may be provided with a DU configuration that informs the link direction for an access link between the child node/access UE and itself and link availability information.

In the existing IAB node, the DU and the MT performed TDM operation which is to operate through different time resources. On the other hand, in a future communication system, it may be required to perform resource multiplexing such as SDM/FDM and full duplexing (FD) between DUs and MTs for efficient resource management.

Figure 17:
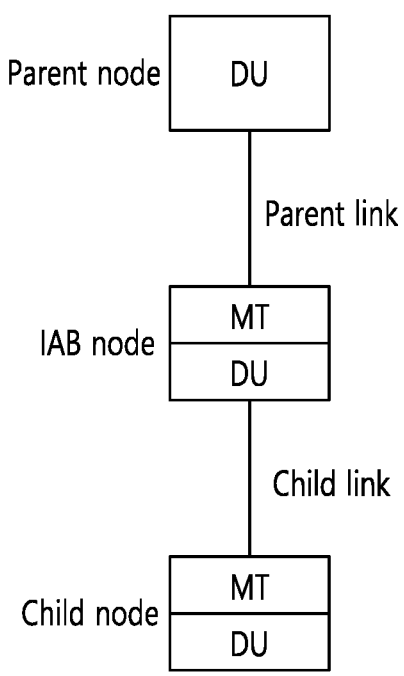
FIG. 17 illustrates a parent link and a child link.

FIG. 17 illustrates a parent link and a child link.

Referring to FIG. 17, a link between an IAB node (specifically, IAB MT) and a parent node (specifically, parent DU) is referred to as a parent link, and a link between an IAB node (specifically, IAB DU) and a child node (specifically, child MT) is called a child link. The parent link may be the above-mentioned backhaul link, and the child link may be a backhaul link or an access link depending on what the child node is. That is, if the child node is an IAB node, it may be a backhaul link, and if the child node is a UE, it may be an access link. TDM operation between parent link and child link has been previously discussed, and SDM/FDM and FD operation are currently being discussed.

From the point of view of the DU of the IAB node, there are multiple types of time resources for the child link, such as downlink (DL), uplink (UL), and flexible (F).

Each downlink, uplink and flexible time resource of the DU's child link may be a hard, soft, or unavailable (NA) resource. Here, the unavailable resource means that the resource is not used for communication of the DU child link. Hard resources means that they are always available for communication on the DU child link. Whether soft resources can be used for communication in the DU child link (availability) may be explicitly and/or implicitly controlled by the parent node.

In the present disclosure, a configuration for a link (resource) direction (DL/UL/F) and link (resource) availability (Hard/Soft/NA) of a time resource for a DU child link may be referred to as a 'DU configuration'. This configuration can be used for effective multiplexing and interference handling between IAB nodes. For example, the above configuration may be used to indicate for which link a time resource is valid for a parent link and a child link. It can also be used to coordinate interference between child nodes. Considering this aspect, the DU configuration may be more effective when configured semi-statically and configured specifically for an IAB node.

The availability of soft resources can be dynamically configured through physical layer (L1)-based implicit/explicit signals. Hereinafter, "IA" may mean that the DU resource is explicitly or implicitly indicated as available, and "INA" may mean that the DU resource is explicitly or implicitly indicated that it is unavailable. Dynamic L1-based signaling may indicate whether the DU soft resource is "IA" or "INA".

From a DU perspective, a soft resource may be in an IA (indicated as available) state or a non-IA state. In this case, the non-IA state may be interpreted as an INA (indicated as not available) state. Whether the soft resource is IA may be indicated through AI (availability indicator) information, and the AI information may be indicated from the parent node to the IAB node through AI-DCI. The following DCI format 2_5 is an example of AI-DCI.

<DCI Format 2_5>

DCI format 2_5 is a DCI format used to inform the availability of soft resources. The following information may be transmitted through DCI format 2_5 together with CRC scrambled by AI-RNTI.

Availability indicator 1, availability indicator 2, . . . , availability indicator N.

The size of DCI format 2_5 with CRC scrambled by AI-RNTI may be configured by a higher layer up to 128 bits.

Similar to the SFI configuration for the access link, the IAB node MT may have three types of time resources for the parent link: downlink (DL), uplink (UL), and flexible (F).

DU and MT existing in the same IAB node (or co-located) may not operate at the same time and may operate in TDM, for some reason such as intra-node interference, slot/symbol boundary misalignment, power sharing, etc.

On the other hand, SDM/FDM multiplexing may be used between the DU and the MT. For example, it is applicable when the DU and the MT use different panels and there is little interference effect between the panels. In this case, the DU and the MT that exist in the same IAB node (or are co-located) can transmit (DU transmit, MT transmit) or receive (DU receive, MT receive) at the same time. (It is impossible for DU and MT to simultaneously perform transmission and reception (DU transmission, MT reception) or reception and transmission (DU reception, MT transmission), respectively).

Alternatively, full duplexing (FD) may be used between the DU and the MT. For example, it is applicable to a case where there is little interference effect between the DU and the MT, such as a case in which the frequency region in which the DU operates and the frequency region in which the MT operates are far apart. In this case, the DU and the MT that exist in the same IAB node (or are co-located) can freely transmit and receive at the same time. The DU and the MT can transmit or receive at the same time, and it is also possible for the DU and the MT to simultaneously perform transmission and reception or reception and transmission, respectively.

The MT and DU of the IAB node may be configured with a plurality of component carriers (CCs) (meaning that a plurality of CCs are used). In this case, different CCs may operate in the same or different frequency regions or may use the same or different panels.

Figure 18:
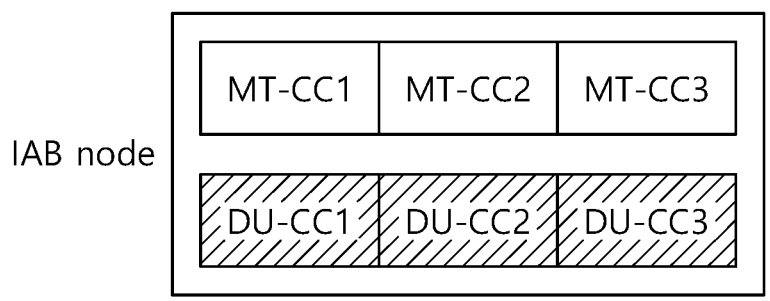
FIG. 18 shows an example of using a plurality of CCs in MT and DU of an IAB node.

FIG. 18 shows an example of using a plurality of CCs in MT and DU of an IAB node.

Referring to FIG. 18, the MT and DU of the IAB node may use a plurality of component carriers (CCs) (or it may be expressed that the MT and the DU of the IAB node consist of a plurality of CCs).

In this case, different CCs may operate in the same or different frequency regions or may use the same or different panels. For example, as shown in FIG. 18, each of three CCs may exist in the MT and the DU in the IAB node. The three CCs in the MT are called MT-CC1, MT-CC2, and MT-CC3, respectively, and the three CCs in the DU are called DU-CC1, DU-CC2, and DU-CC3, respectively.

In this case, one multiplexing scheme among TDM, SDM/FDM, and FD may be applied between the specific CC of the MT and the specific CC of the DU. For example, when a specific MT-CC and a DU-CC are located in different inter-band frequency regions, FD may be applied between the corresponding MT-CC and the DU-CC.

On the other hand, the TDM scheme may be applied between the MT-CC and the DU-CC located in the same frequency region. For example, in FIG. 18, MT-CC1, MT-CC2, DU-CC1, DU-CC2 has f1 as a center frequency, MT-CC3, DU-CC3 has f2 as a center frequency, f1 and f2 may be located within an inter-band of each other. In this case, MT-CC1 (or MT-CC2) may operate in TDM with DU-CC1 and DU-CC2, but may operate in FD with DU-CC3. On the other hand, from the standpoint of MT-CC3, it operates in FD with DU-CC1 and DU-CC2, but may operate in TDM with DU-CC3.

On the other hand, a different multiplexing scheme between the MT and the DU may be applied even within the same CC. For example, a plurality of parts may exist within the CC of the MT and/or DU. This part may mean, for example, a link transmitted through an antenna having the same center frequency but a different physical location or a different panel. Alternatively, the part may mean, for example, a link having the same center frequency but transmitted through different BWPs. In this case, for example, when two parts exist in DU-CC1, a multiplexing type operating with a specific MT-CC or a specific part in a specific MT-CC may be different for each part. The following disclosure describes a case in which the multiplexing type applied to each pair of the MT CC and the DU CC may be different, the disclosure may be extended and applied even when MT and DU are divided into a plurality of parts and a multiplexing type applied to each pair of CC and part of MT and CC and part of DU may be different.

In the context of the present disclosure, the DU-CC may be interpreted as being replaced with a DU cell.

The Tx/Rx timing alignment method of the IAB node that can be considered in the IAB environment may be as follows.

Case 1: Alignment of DL transmission timing between IAB node and IAB donor.

Case 2: DL and UL transmission timings are aligned within the IAB node.

Case 3: DL and UL reception timings are aligned within the IAB node.

Case 4: Within the IAB node, use case 2 for transmission and case 3 for reception.

Case 5: In different time slots within the IAB node, use case 1 for access link timing and case 4 for backhaul link timing.

Case 6: Using the DL transmission timing of case 1 and the UL transmission timing of case 2.

Case 7: Using the DL transmission timing of case 1 and the UL transmission timing of case 3.

Hereinafter, some cases among the timing alignment cases will be described in more detail.

Timing alignment case 1 (hereinafter may be abbreviated as case 1).

Figure 19:
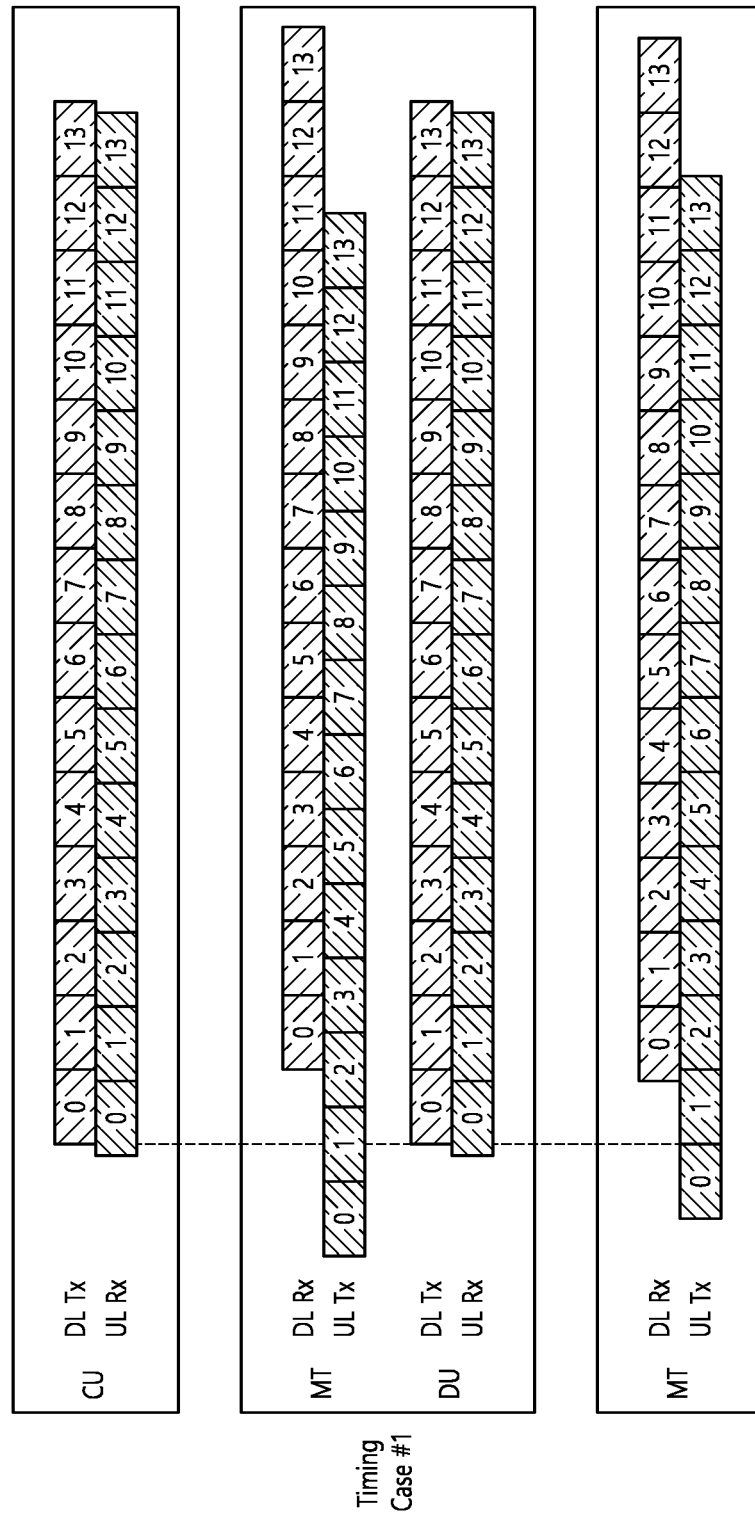
FIG. 19 illustrates timing alignment case 1.

FIG. 19 illustrates timing alignment case 1.

Referring to FIG. 19, in case 1, DL transmission (Tx) timing is aligned between an IAB node and an IAB donor (represented by a CU). That is, the DL Tx timing of DUs between IAB nodes is aligned, and this is a timing alignment method used by the Rel-16 IAB node.

If the DL Tx and UL Rx are not well aligned in the parent node, additional information about alignment may be required for the child node to properly set the DL Tx timing. The MT Tx timing may be expressed as 'MT Rx timing-TA', and the DU Tx timing may be expressed as 'MT Rx timing-TA/2-T_delta'. The T_delta value can be obtained from the parent node.

Timing alignment case 6 (hereinafter may be abbreviated as case 6)

Figure 20:
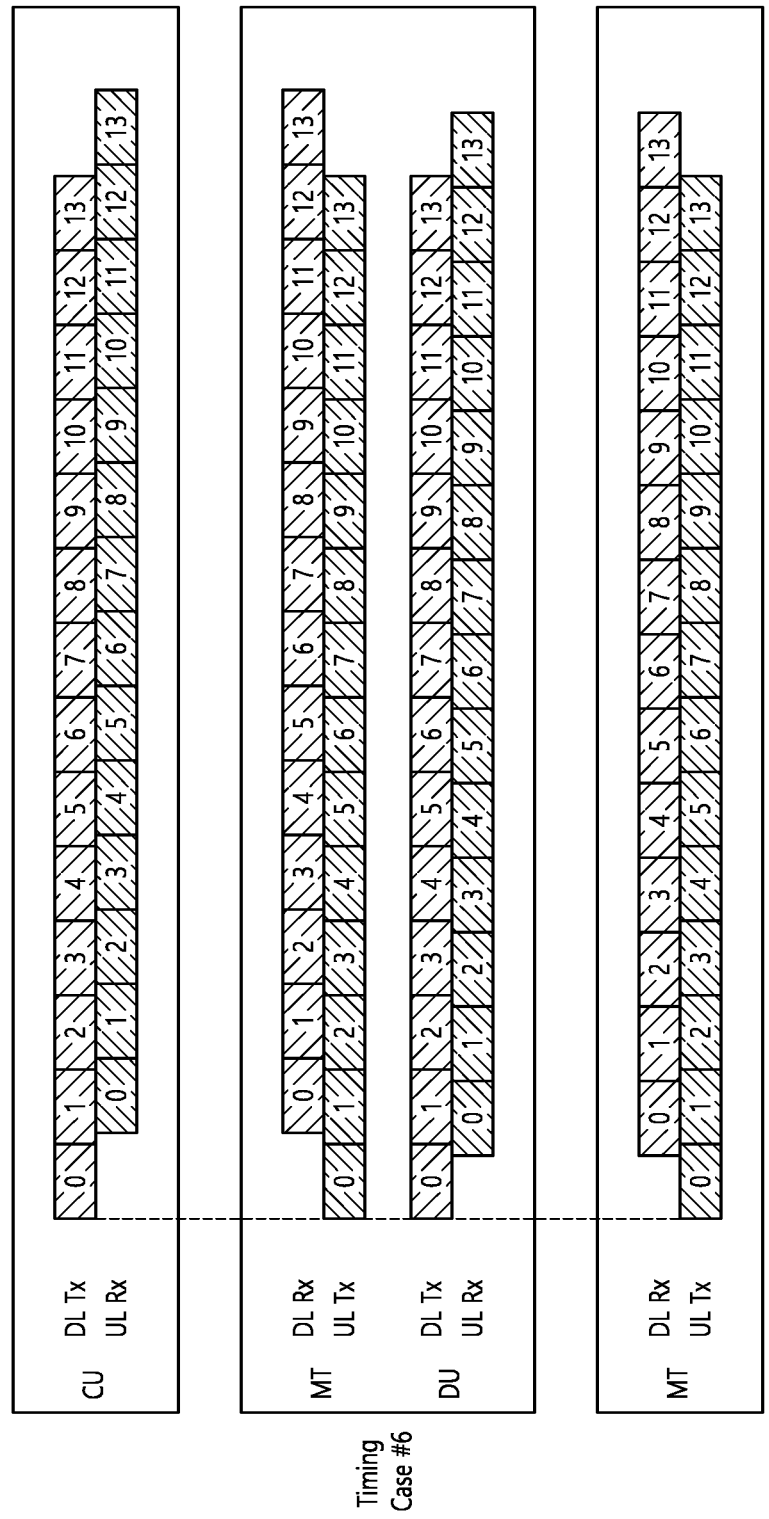
FIG. 20 illustrates timing alignment case 6.

FIG. 20 illustrates timing alignment case 6.

Referring to FIG. 20, Case 6 is a case in which DL transmission timings for all IAB nodes coincide with parent IAB node (CU) or donor DL timings. The UL transmission timing of the IAB node may be aligned with the DL transmission timing of the IAB node. That is, the MT UL Tx timing and the DU DL Tx timing of the IAB node are aligned.

Since the UL Tx timing of the MT is fixed, the UL Rx timing of the parent-DU receiving it is delayed by the propagation delay of the parent-DU and the MT compared to the UL Tx timing of the MT. The UL Rx timing of the MT varies according to the child MT that transmits the UL. When the IAB node uses the timing alignment case 6, the UL Rx timing of the parent node is different from the existing one. Therefore, if the IAB node wants to use the timing alignment case 6, the parent node also needs to know the corresponding information.

Timing alignment case 7.

Figure 21:
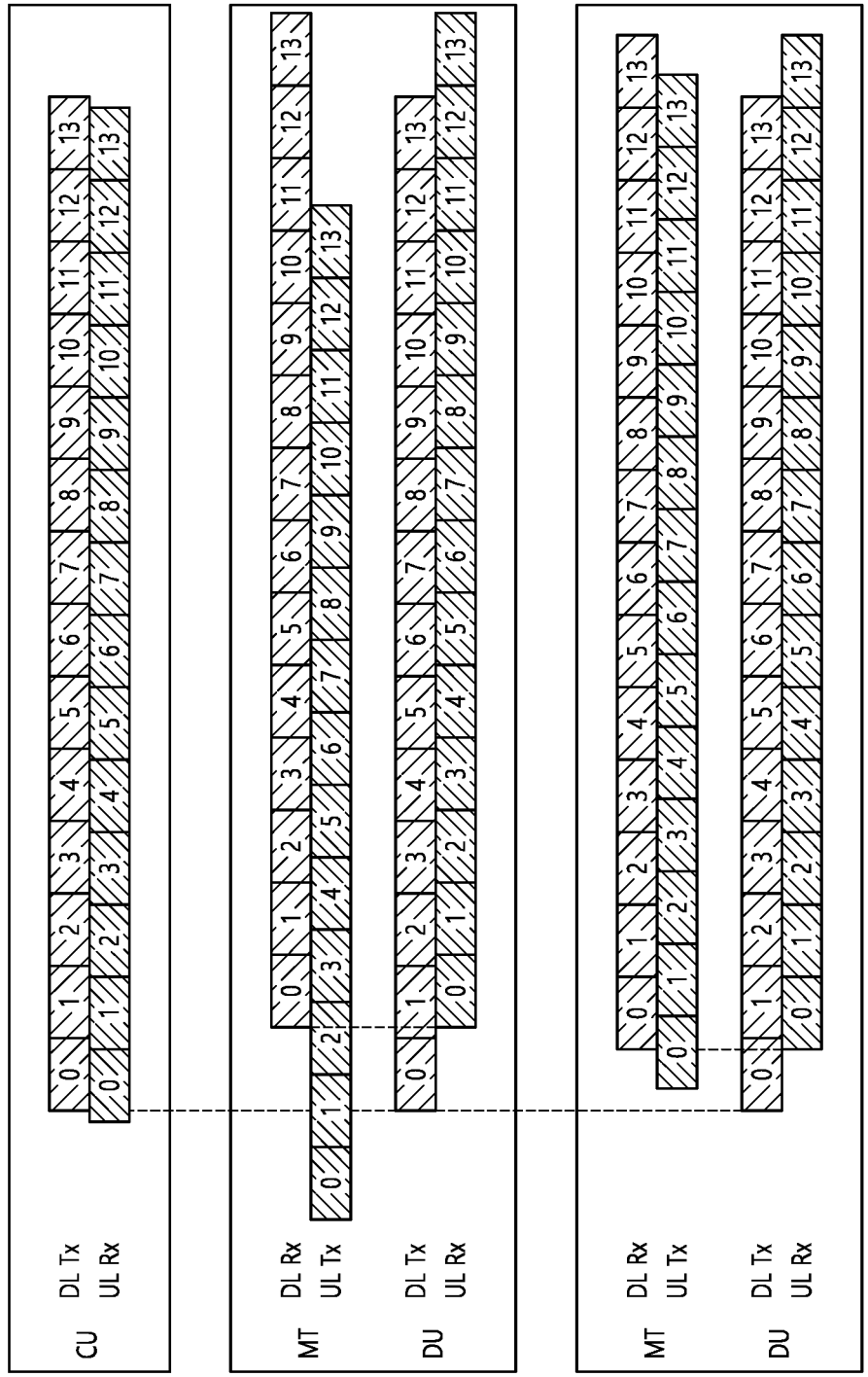
FIG. 21 illustrates timing alignment case 7.

FIG. 21 illustrates timing alignment case 7.

Referring to FIG. 21, in case 7, DL transmission timings for all IAB nodes coincide with parent IAB node or donor DL timings. The UL reception timing of the IAB node may coincide with the DL reception timing of the IAB node. If the DL Tx and UL Rx are not well aligned in the parent node, additional information about alignment may be required for the child node to properly set the DL Tx timing. Case 7 is a scheme in which the MT DL Rx timing of the IAB node and the DU UL Rx timing are aligned.

The transmission/reception timing from the MT perspective is the same as that of the existing IAB node (Rel-16 IAB node), and the UL Rx timing of the DU may be aligned with the DL Rx timing of the MT. The IAB node needs to adjust the TA of the child MTs so that the child MTs transmit UL signals according to IAB node's UL Rx timing.

This timing alignment method may not reveal a difference in the standard operation of the IAB node compared to the existing timing alignment method (Case 1). Accordingly, the timing alignment case 7 may be replaced/interpreted as the timing alignment case 1.

In the present disclosure, timing alignment may mean slot-level alignment or symbol-level alignment.

Hereinafter, the present disclosure will be described.

First, DAPS-HO (Dual active protocol stack based handover) will be described.

The DAPS handover (hereinafter may be abbreviated as DAPS) may be referred to as a handover procedure for maintaining a connection to the source gNB until the source cell (source gNB) is released after receiving the RRC message (HO Command) for handover and successful random access to the target cell (target gNB).

From the functional point of view of the UE, the DAPS may generally have the following characteristics.

In terms of transmission operation, 1) a common sequence number (SN), 2) separate header compression for the source cell and the target cell, 3) separate ciphering for the source cell and the target cell.

In terms of reception operation, 1) separate deciphering for source cell and target cell, 2) separate header decompression for source cell and target cell, 3) common PDCP reordering, 4) In-sequence delivery and duplication detection, 5) Common buffer management.

In general, the network and the UE have the same process and function for both transmission and reception operations. The difference may be whether these functions are co-located. In the network, all functions except DL PDCP SN allocation and UL PDCP reordering are separately deployed and not performed by the source eNB or the target eNB. Accordingly, it is assumed that two PDCP entities are located in the source eNB and the target eNB, respectively.

On the UE side, all functions including SN allocation and PDCP reordering are deployed together. Accordingly, all functions for DAPS can be modeled as a single PDCP entity in the UE side. For single UL data transmission, only header compression and security processing for the source eNB or target eNB may be used.

RF/baseband requirements of the UE.

In order to minimize interruption, regardless of whether the UE is SAPS or DAPS, it may be necessary to continue data transmission/reception with the source cell when performing a random access procedure for the target cell. This is possible only when the UE supports simultaneous transmission and reception with two cells. In most cases, it works on UEs with dual Rx/dual Tx chains. In the case of a UE with a dual Rx/single Tx RF chain or a single Rx/single Tx RF chain, more restrictions may be applied. In addition, it may be necessary to divide the capabilities of the UE for effective use of baseband and RF resources. Since tuning of the baseband and RF resources of the UE is not so simple in the case of SAPS, additional interruption and complexity of the UE may occur.

For UEs with dual Rx/single Tx RF chains, to support simultaneous UL data transmission to a source eNB and UL RACH transmission to a target eNB, if some requirements can be met (e.g., if the bandwidth of the source cell is greater than the bandwidth of the target cell, and the Tx power difference for the two cells is within a certain limit), simultaneous transmission may be supported.

Otherwise, some kind of UL TDM pattern is needed, which may add additional interruption time and UL switching complexity. But this UE option provides flexibility of different UE implementation flavors in terms of hardware and power efficiency (especially for low tier devices, UEs which are not capable of UL CA and/or UL MIMO).

For UEs with Single Rx/Single Tx RF chains, if some requirements can be met, e.g. the bandwidth of the source cell is larger than that of the target cell, Tx/Rx power difference for the two cells is in a certain limit, the simultaneous transmission/reception can still be supported. Otherwise TDM design is required for both DL and UL, which adds additional complexity at both UE and network side. Furthermore, RF chain switching is required for both DL and UL, which will increase the HO interruption time and switching complexity.

If a UE indicates a capability for dual active protocol stack based handover (DAPS HO), the UE can be provided with a source MCG and a target MCG. The UE may determine the transmission power of the MCG and the transmission power of the SCG for each frequency range.

UE transmission may overlap in the target cell and the source cell. For example, 1) when carrier frequencies for target MCG and source MCG are intra-frequency and intra-band, and time resources overlap, 2) when carrier frequencies for target MCG and source MCG are not in frequency and in band, UE transmission may overlap in overlapping time resources and overlapping frequency resources.

In the case of intra-frequency DAPS HO operation, the UE can expect that the activated DL BWP and activated UL BWP of the target cell are in the activated DL BWP and activated UL BWP of the source cell, respectively.

The UE may provide the ability to monitor the maximum number of PDCCH candidates per slot for the target MCG and the ability to monitor the maximum number of PDCCH candidates per slot for the source MCG.

For PRACH transmission, an IAB-node MT determines frames and subframes within the frames containing PRACH occasions. The IAB-node MT determines an association period for mapping SS/PBCH blocks to PRACH occasions based on a PRACH configuration period according to below table. An association pattern period includes one or more association periods and is determined so that a pattern between PRACH occasions and SS/PBCH blocks repeats at most every 640 msec. A PRACH occasion in a PRACH slot may be valid or invalid according to the conditions.

The following table illustrates the mapping between the PRACH configuration period for the MT of the IAB node and the SS/PBCH block.

TABLE 5

| PRACH configuration period (msec) | Association period, number of PRACH configuration periods |
|---|---|
| 10 | {1, 2, 4, 8, 16, 32, 64} |
| 20 | {1, 2, 4, 8, 16, 32} |
| 40 | {1, 2, 4, 8, 16} |
| 80 | {1, 2, 4, 8} |
| 160 | {1, 2, 4} |
| 320 | {1, 2} |
| 640 | {1} |

If an IAB-node is provided a value $T_{delta}$ from a serving cell, the IAB-node may assume that $(N_{TA}+N_{TA,offset}) \cdot T_c/2 + T_{delta}$ is a time difference between a DU transmission of a signal from the serving cell and a reception of the signal by the IAB-node MT when $(N_{TA}+N_{TA,offset}) \cdot T_c/2 + T_{delta} > 0$. The IAB-node may use the time difference to determine a DU transmission time.

A slot format for an IAB-node DU or an IAB-node MT includes downlink symbols, uplink symbols, and flexible symbols.

For each serving cell of the DU of the IAB node, the DU of the IAB node may be provided with 'IAB-DU-Resource-Configuration'. 'IAB-DU-Resource-Configuration' may provide an indication of a slot format over a number of slots.

If the IAB-node MT is provided 'tdd-UL-DL-ConfigDedicated-IAB-MT', the parameter 'tdd-UL-DL-ConfigDedicated-IAB-MT' overrides only flexible symbols over the number of slots as provided by 'TDD-UL-DL-ConfigurationCommon'.

'tdd-UL-DL-ConfigDedicated-IAB-MT' may provide the following information.

1) Slot configuration set by 'slotSpecificConfigurationsToAddModList-IAB-MT', 2) For each slot configuration in the slot configuration set, the slot index for the slot provided by 'slotIndex', for the symbol sets for the slot by 'symbols', if 'symbol' is 'allDownlink', all symbols in the slot are downlink, if 'symbols' is 'allUplink', all symbols in the slot are uplink, and if 'symbol' is 'explicit', 'nrofDownlinkSymbols' provides a number of downlink first symbols in the slot and 'nrofUplinkSymbols' provides a number of uplink last symbols in the slot. If 'nrofDownlinkSymbols' is not provided, it may mean that there are no downlink first symbols in the slot, and if 'nrofUplinkSymbols' is not provided, it may mean that there are no uplink last symbols in the slot. The remaining symbols in the slot are flexible symbols.

if 'symbols' is 'explicit-IAB-MT', 'nrofUplinkSymbols' provides a number of uplink first symbols in the slot and 'nrofDownlinkSymbols' provides a number of downlink last symbols in the slot. If 'nrofUplinkSymbols' is not provided, it may means that there are no uplink first symbols in the slot and if 'nrofDownlinkSymbols' is not provided, it may means that there are no downlink last symbols in the slot. The remaining symbols in the slot are flexible.

The slot format for the DU of the IAB node or the MT of the IAB node may include a downlink symbol, an uplink symbol, and a flexible symbol. The slot format information may refer to information indicating whether each symbol is a downlink symbol, an uplink symbol, and a flexible symbol.

For each slot having the corresponding index provided by 'slotIndex', the MT of the IAB node may apply the format provided by the corresponding 'symbols'. The MT of the IAB node is provided with a list of slot format combinations applicable to one serving cell by 'SlotFormatCombinationsPerCell-IAB-MT', a configuration for monitoring DCI format 2_0 indicating a slot format combination may be provided by 'SlotFormatIndicator-IAB-MT'. The SFI field of DCI format 2_0 may indicate one slot format to the MT of the IAB node among the slot formats of the following table.

The following table illustrates the slot format in the normal CP.

TABLE 6

| Slot Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | F | F | F | D | D |
| 82 | U | U | U | U | U | U | U | U | F | F | F | F | D | D |
| 83 | U | U | U | U | U | U | U | F | F | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | F | F | F | F | F | D |
| 94 | U | U | U | U | U | F | F | F | F | F | F | D | D | D |
| 95 | U | U | U | U | U | F | F | D | D | D | D | D | D | D |
| 96 | U | U | U | U | U | U | D | D | D | D | D | D | D | D |

The MT of the IAB node may be provided with a number or the number of symbols not used by the MT of the IAB node by 'guard-SymbolsProvided'. In the symbols, the IAB node may perform a transition between the MT and the DU. The SCS configuration for the number of symbols may be provided by 'guardSymbol-SCS'.

A symbol in the slot of the DU serving cell of the IAB node may be set to a hard, soft, or unavailable type. When the downlink, uplink, or flexible symbol is configured as hard, the DU serving cell of the IAB node can respectively transmit, receive, or 'transmit or receive' operation on the corresponding symbol.

If the downlink, uplink, or flexible symbol is configured as soft, the DU of the IAB node (DU serving cell) can respectively transmit, receive, or 'transmit or receive' operations on the corresponding symbol only in the following cases.

1) for the IAB-node MT, ability to transmit or receive by the IAB-node DU in the soft symbol is equivalent to a configuration of the soft symbol as unavailable, 2) the IAB-node DU detects a DCI format 2_5 with an AI index field value indicating the soft symbol as available for transmission or reception.

That is, when a downlink, uplink, or flexible symbol is configured as soft, the IAB-node DU can respectively transmit, receive or either transmit or receive in the symbol only if:

1) If the MT of the IAB node does not transmit or receive in the corresponding symbol, 2) When the MT of the IAB node transmits/receives in the corresponding symbol, and the transmission/reception of the corresponding symbol by the MT of the IAB node is not changed due to the use of the corresponding symbol by the DU of the IAB node, 3) a case in which the MT of the IAB node detects DCI format 2_5 having an AI index field value indicating available soft symbols, and the like.

If the symbol is configured as unavailable, the DU of the IAB node does not transmit or receive in the symbol.

When a DU of an IAB node transmits an SS/PBCH block or periodic CSI-RS in a symbol of a slot or receives a PRACH or SR in a symbol, the symbol is equivalent to being configured as hard.

Information on AI-RNTI and information on the payload size of DCI format 2_5 may be provided to the IAB node. In addition, a search space set configuration for monitoring the PDCCH may also be provided.

The following information may be provided to the DU of the IAB node. 1) ID of DU serving cell of IAB node, 2) location of availability indication (AI) index field within DCI format 2_5, 3) availability combination set. Each availability combination within a set of availability combinations may contain the following information: i) information indicating the availability of soft symbols in one or more slots for the DU serving cell of the IAB node, ii) information related to mapping between the corresponding AI index field value of DCI format 2_5 and the soft symbol availability combination.

The random access preamble may be transmitted only in a time resource provided by a higher layer parameter (prach-ConfigurationIndex), and may be configured differently depending on FR1 or FR2, spectrum type.

Based on this discussion, a situation in which a specific IAB node is connected to two parent nodes and links with the two parent nodes use the same or adjacent frequency region will be considered below. In this case, in order to prevent cross link interference from being given to each other because the DL/UL directions of the two links are different from each other, a method for operating the DL/UL directions between the two links to be the same is proposed.

DU and MT existing in the same IAB node (or co-located) may not operate at the same time and may be operated by TDM due to intra-node interference, slot/symbol boundary misalignment, power sharing, etc.

On the other hand, SDM/FDM multiplexing may be used between the DU and the MT. For example, it is applicable when the DU and the MT use different panels and there is little interference effect between the panels. In this case, the DU and the MT that exist in the same IAB node (or are co-located) can transmit or receive at the same time, and it is impossible for each of the DU and the MT to perform transmission and reception or reception and transmission at the same time, respectively.

Alternatively, full duplexing (FD) may be used between the DU and the MT. For example, it is applicable when there is little interference effect between the DU and the MT, such as when the frequency region in which the DU operates and the frequency region in which the MT operates are far apart. In this case, the DU and the MT existing in the same IAB node (or co-located) can freely transmit and receive at the same time. The DU and the MT can transmit or receive at the same time, and it is also possible for the DU and the MT to simultaneously transmit and receive, or receive and transmit.

The MT and DU of the IAB node may consist of a plurality of component carriers (CCs). In this case, different CCs may operate in the same or different frequency regions or may use the same or different panels.

Figure 22:
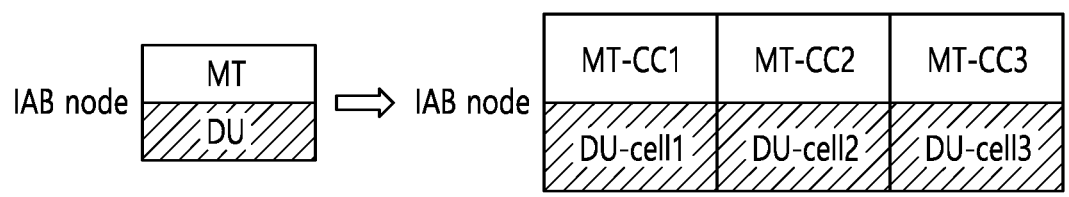
FIG. 22 illustrates an MT and a DU in an IAB node.

FIG. 22 illustrates an MT and a DU in an IAB node.

Referring to FIG. 22, three CCs may exist in each of the MT and the DU in the IAB node. The three CCs existing in the MT are referred to as MT-CC1, MT-CC2, and MT-CC3, respectively. In the case of DU, CC is replaced with a cell and is called DU-Cell1, DU-Cell2, and DU-Cell3.

In this case, one multiplexing scheme among TDM, SDM/FDM, and FD may be applied between a specific CC of the MT and a specific cell of the DU. For example, when a specific MT-CC and a DU-cell are located in different inter-band frequency regions, FD may be applied between the corresponding MT-CC and the DU-cell. On the other hand, the TDM scheme may be applied between the MT-CC and the DU-CC located in the same frequency region.

For example, MT-CC1, MT-CC2, DU-cell1, DU-cell2 have f1 as the center frequency, MT-CC3, DU-cell3 have f2 as the center frequency, and f1 and f2 may be located within an inter-band of each other. In this case, in the position of MT-CC1 (or the position of MT-CC2), it operates by performing TDM with DU-cell 1 and DU-cell 2, but may operate in FD with DU-cell 3. On the other hand, from the standpoint of MT-CC3, it operates in FD with DU-cell 1 and DU-cell 2, but can operate in TDM with DU-cell 3.

A different multiplexing scheme between the MT and the DU may be applied even within the same CC. For example, a plurality of parts may exist in the MT-CC and/or the DU-cell. Such a part may mean, for example, a link transmitted through an antenna having the same center frequency but a different physical location or a different panel.

Alternatively, a part may mean, for example, a link having the same center frequency but transmitted through different bandwidth parts (BWP). In this case, for example, when two parts exist in DU-Cell 1, a multiplexing type operating with a specific MT-CC or a specific part in a specific MT-CC may be different for each part. The following disclosure describes a case in which a multiplexing type applied to each pair of MT CC and DU cell can be different. However, even when the MT and the DU are divided into a plurality of parts and the multiplexing type applied to each pair of the CC and part of the MT and the cell and part of the DU may be different, the following disclosure may be extended and applied.

It may be considered that one IAB node is connected to two or a plurality of parent nodes. In this case, the IAB MT may be connected to two parent DUs using a dual-connectivity (DC) scheme.

The IAB node may have a redundant route to the IAB donor CU. For an IAB node operating in SA mode, a new radio (NR) DC may enable path redundancy in the BH by allowing the IAB-MT to have a BH RLC channel concurrent with two parent nodes. Two parent nodes may have to be connected to the same IAB donor CU-CP that controls establishment and release of redundant paths. Together with the IAB donor CU, the parent node can act as the master node and the secondary node of the IAB-MT. The NR DC framework (e.g., MCG/SCG related procedures) can be used to configure a dual radio link with a parent node.

The following scenarios may be considered in a manner in which the IAB MT is connected to two parent DUS.

Scenario 1. Connection to multiple parent DUs using different MT-CCs with adjacent carrier frequencies.

The IAB MT may establish a connection with a plurality of parent DUs using different MT-CCs. That is, one MT-CC establishes a connection with one parent DU-cell, and the corresponding parent DU-cells may exist in different parent DUs.

Figure 23:
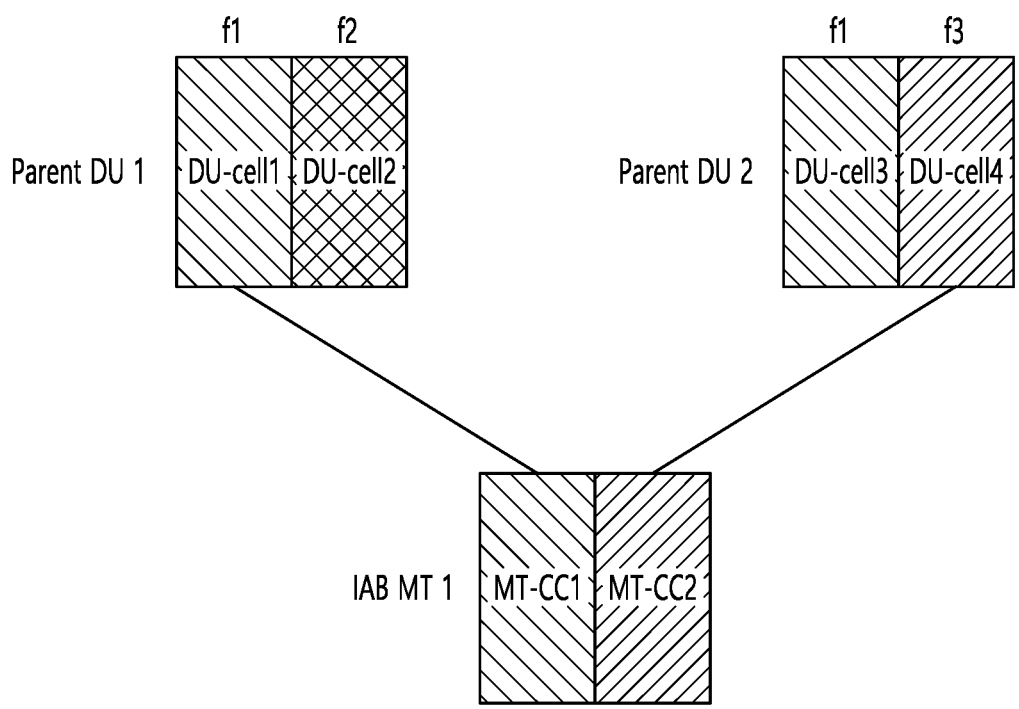
FIG. 23 illustrates Scenario 1.

FIG. 23 illustrates Scenario 1.

Referring to FIG. 23, MT-CC1 and MT-CC2 exist in IAB MT1, MT-CC1 is connected to DU-cell 1 in parent DU1, and MT-CC2 is connected to DU-cell 4 in parent DU2. In this case, from the IAB MT1 perspective, the link between one MT-CC and one DU-cell is referred to as one parent link. In this case, the link between MT-CC1 and DU-cell 1 and the link between MT-CC2 and DU-cell 4 become different parent links.

In this way, in order to establish a connection with a DU-cell in different parent DUs using different MT-CCs, an existing dual-connectivity (DC) method may be used. In this case, when the IAB MT is connected to two parent DU-cells using different MT-CCs, one parent DU-cell belongs to a master cell group (MCG), and the remaining parent DU-cell may belong to SCG (secondary cell group).

It may be assumed that each MT-CC of the IAB MT has an independent RF chain. Accordingly, each MT-CC may perform Tx/Rx operations independently and simultaneously. Each MT-CC may set and manage Tx/Rx timing based on a parent DU-cell connected to it.

In Scenario 1, it is considered that MT-CCs connected to different parent DUs operate on different carrier frequencies in the above situation. That is, in FIG. 23, the link between MT-CC1 and DU-cell 1 and the link between MT-CC2 and DU-cell 4 have different carrier frequencies. The link between MT-CC1 and DU-cell1 may have a carrier frequency of f1, while the link between MT-CC2 and DU-cell4 may have a carrier frequency of f3. In this case, the carrier frequency regions operating in the two parent links may be adjacent. In this case, if the parent links operate in different D/U directions, cross-link interference may occur. In this scenario, we consider a situation where the carrier frequency regions between two parent links are adjacent to each other and cross-link interference occurs to the extent that it affects performance.

The IAB MT may establish a connection with a plurality of parent DUs using different MT-CCs. That is, one MT-CC establishes a connection with one parent DU-cell, and the parent DU-cells may exist in different parent DUs.

Figure 24:
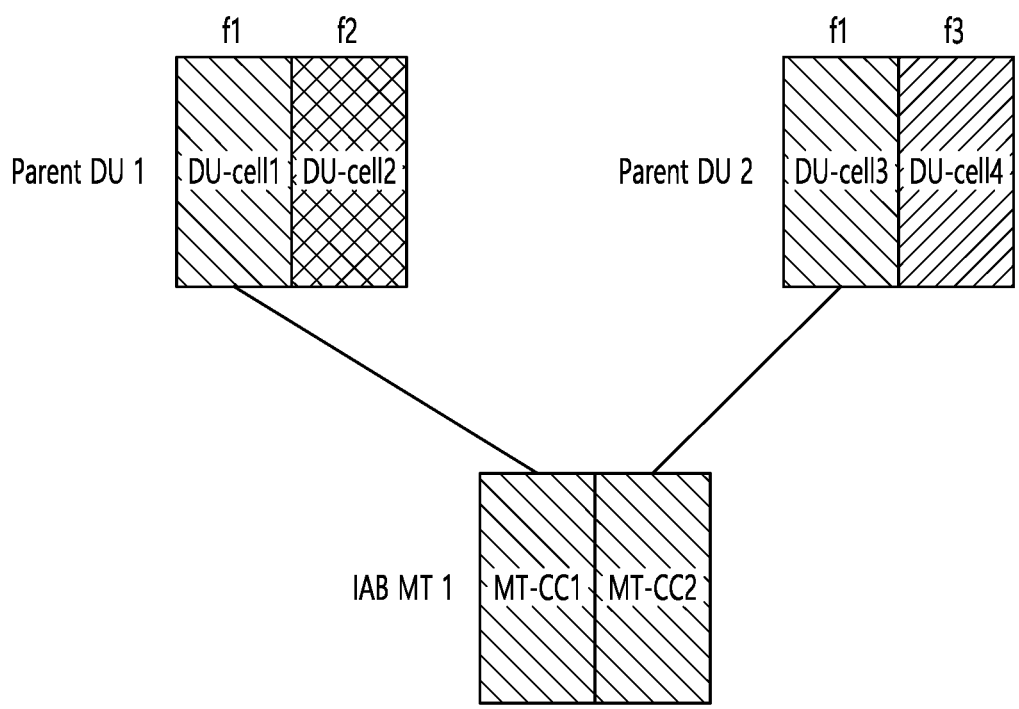
FIG. 24 shows another example in which IAB MT1 and two parent DUs are connected.

FIG. 24 shows another example in which IAB MT1 and two parent DUs are connected.

Referring to FIG. 24, MT-CC1 and MT-CC2 exist in IAB MT1, MT-CC1 is connected to DU-cell 1 in parent DU1, and MT-CC2 can be connected to DU-cell 3 in parent DU2. In this case, a link between one MT-CC and one DU-cell may be referred to as one parent link from the viewpoint of IAB MT1. In this case, the link between MT-CC1 and DU-cell 1 and the link between MT-CC2 and DU-cell 3 become different parent links.

In this way, in order to establish a connection with a DU-cell in different parent DUs using different MT-CCs, an existing dual-connectivity scheme may be used. In this case, when the IAB MT is connected to two parent DU-cells using different MT-CCs, one parent DU-cell may belong to the MCG and the other parent DU-cell may belong to the SCG.

Each MT-CC of the IAB MT can have an RF chain independent of each other. Accordingly, each MT-CC may perform Tx/Rx operations independently and simultaneously. Each MT-CC may set and manage Tx/Rx timing based on a parent DU-cell connected to it.

In Scenario 2, it is considered that MT-CCs connected to different parent DUs operate on the same carrier frequency in the above situation. That is, consider a situation in which the link between MT-CC1 and DU-cell 1 and the link between MT-CC2 and DU-cell 3 have the same carrier frequency in FIG. 24.

In this scenario, it means that different MT-CCs in the IAB MT can operate with the same carrier frequency, and it means that a plurality of MT-CCs can exist in the same frequency region. In FIG. 24, the link between MT-CC1 and DU-cell 1 may have a carrier frequency of f1, and the link between MT-CC2 and DU-cell 3 may also have a carrier frequency of f1. In this case, cross-link interference may occur when parent links operate in different D/U directions. In addition, when resources for which actual DL signals/channels are transmitted through the two MT-CCs overlap each other, they may act as interference with each other. Even in the case of UL, when UL signals/channels transmitted by two MT-CCs overlap, a UL signal/channel transmitted to a specific parent DU may act as interference to other parent DU.

Figure 25:
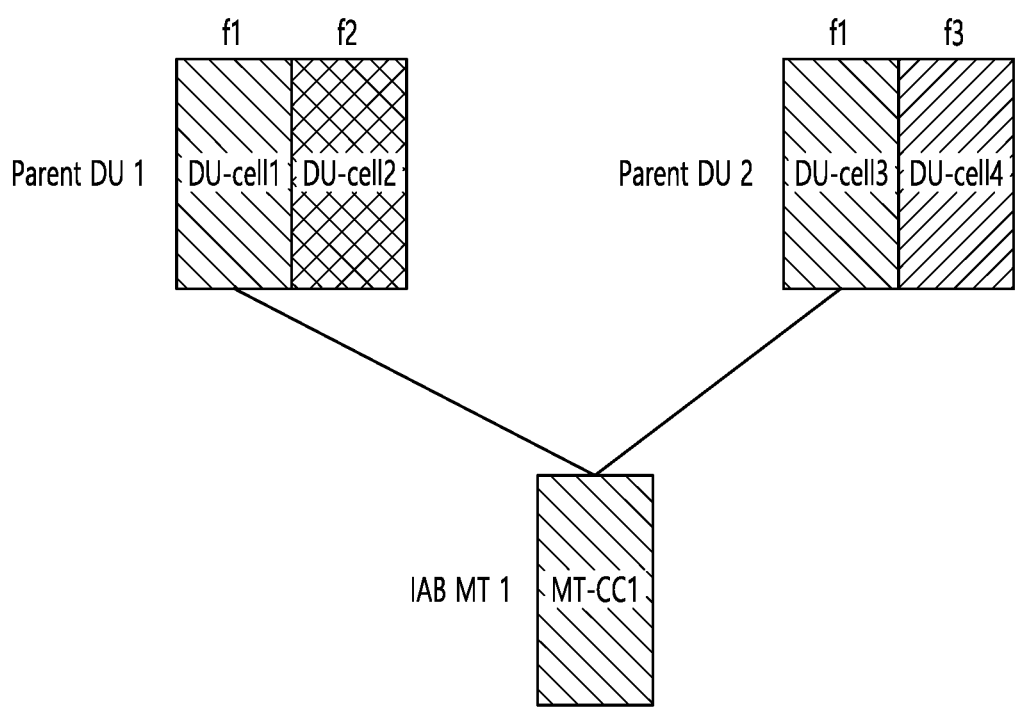
FIG. 25 shows another example in which IAB MT1 and two parent DUs are connected.

FIG. 25 shows another example in which IAB MT1 and two parent DUs are connected.

Referring to FIG. 25, the IAB MT1 may establish a connection with a plurality of parent DUs using one MT-CC. That is, one MT-CC may establish a connection with a plurality of parent DU-cells, and the corresponding parent DU-cells may exist in different parent DUs.

As shown in FIG. 25, MT-CC1 exists in IAB MT1, and MT-CC1 may be connected to DU-cell 1 in parent DU1 and DU-cell 3 in parent DU2. In this case, from the viewpoint of IAB MT1, it is assumed that a link between one MT-CC and one DU-cell is one parent link. In this case, the link between MT-CC1 and DU-cell 1 and the link between MT-CC1 and DU-cell 3 become different parent links. The link between MT-CC1 and DU-cell 1 may have a carrier frequency of f1, and the link between MT-CC1 and DU-cell 3 may also have a carrier frequency of f1.

Scenario 3-1. Multiple Parent DU Connection with Multiple RF Modules

One MT-CC in the IAB MT may have a plurality of RF chains. For example, one MT-CC may communicate with different parent DUs on the same carrier frequency using two RF modules. In this case, there is only one MT-CC, but the MT-CC supports RF modules independent of each other and can establish a connection with a plurality of parent DUs at the same time. Accordingly, the MT-CC may independently and simultaneously perform Tx/Rx operations on a plurality of parent DUs. Each RF module of the MT-CC may set and manage Tx/Rx timing based on the parent DU-cell connected to it. In this case, cross-link interference may occur when parent links operate in different D/U directions. In addition, when resources in which actual DL signals/channels are transmitted through two parent links overlap each other, they may act as interference with each other. Even in the case of UL, when UL signals/channels transmitted through two parent links overlap, the UL signals/channels transmitted to a specific parent DU may act as interference to other parent DU.

Scenario 3-2. Multiple Parent DU Connection with a Single RF Module

One MT-CC in the IAB MT may have one RF chain. Therefore, the MT-CC may not be able to transmit and receive simultaneously with two parent links operating at different Tx/Rx timings. In addition, simultaneous transmission and reception with two parent links operating in different analog beam directions may not be performed. Therefore, the MT-CC must perform operations to different parent links using different time resources. In this case, the MT-CC may independently set and manage Tx/Rx timing for each parent DU connected thereto.

Scenario 4. DAPS HO (Dual Active Protocol Stack Based Handover)

DAPS HO is introduced for mobility enhancement of the UE. Such DAPS HO may also be applied to IAB MT. In the case of applying DAPS HO, let the MCG currently connected to the UE be a source MCG, and the MCG to be handover is called a target MCG. In this case, the UE may be simultaneously connected to the source MCG and the target MCG using the same carrier frequency. When the IAB MT establishes a connection with a plurality of parent DUs using the same carrier frequency, the DAPS HO scheme may be used. In this case, two parent DUs may be connected by using one parent DU as a source MCG and another parent DU as a target MCG.

The content proposed by the present disclosure is based on configuration and operating two parent DUs as MCG and SCG, respectively. However, it may include operating as a DAPS HO with the MCG and the SCG as the source MCG and the target MCG (or the target MCG and the source MCG), respectively. In this case, MCG and SCG mentioned in the present disclosure may be interpreted by replacing them with source MCG and target MCG (or target MCG and source MCG), respectively.

Hereinafter, the contents of the present disclosure are described assuming an in-band environment, but may also be applied in an out-band environment. In addition, the content of the present disclosure is described in consideration of an environment in which a donor base station (donor gNB: DgNB), a relay node (RN), and a UE perform a half-duplex operation, but may be applied in an environment in which a donor base station, a relay node (RN), and/or the UE perform a full-duplex operation.

In the present disclosure, a situation in which the same IAB MT is connected to different parent DUs is considered. Considering the situation as in the aforementioned scenarios 1, 2, and 3, one MT-CC in the IAB MT is connected to a specific DU-cell in two different parent DUs, or different MT-CCs in the IAB MT may be connected to a specific DU-cell in two different parent DUs, respectively.

When different MT-CCs in the IAB MT are connected to a specific DU-cell in two different parent DUs, respectively, both parent links operate (with carrier frequency) in adjacent frequency regions as in Scenario 1, or they can operate in the same frequency region (with carrier frequency) as in Scenario 2.

As in scenario 3, when one MT-CC is connected to a specific DU-cell in two different parent DUs, let the MT-CC operating in connection with the first parent DU be referred to as MT-CC-A, and the MT-CC operating in connection with the second parent DU will be referred to as MT-CC-B. For example, the MT-CC has two RF modules, and may be divided into MT-CC-A and MT-CC-B according to the RF module. In this case, MT-CC-A becomes an RF module of the MT-CC that operates in connection with the first parent DU, and MT-CC-B becomes an RF module of the MT-CC that operates in connection with the second parent DU. Alternatively, for example, the MT-CC operates by being divided into two time regions, and may be divided into MT-CC-A and MT-CC-B according to the operating time region. In this case, the MT-CC operating in connection with the first parent DU in time region 1 is referred to as MT-CC-A, an MT-CC operating in connection with the second parent DU in time region 2 may be referred to as MT-CC-B. In the present disclosure, MT-CC-A and MT-CC-B are interpreted and described as different MT-CCs for convenience. That is, in the present disclosure, the two different MT-CCs in the IAB MT can mean MT-CC-A and MT-CC-B (i.e., separate RF modules or time resources) in the same MT-CC.

Figure 26:
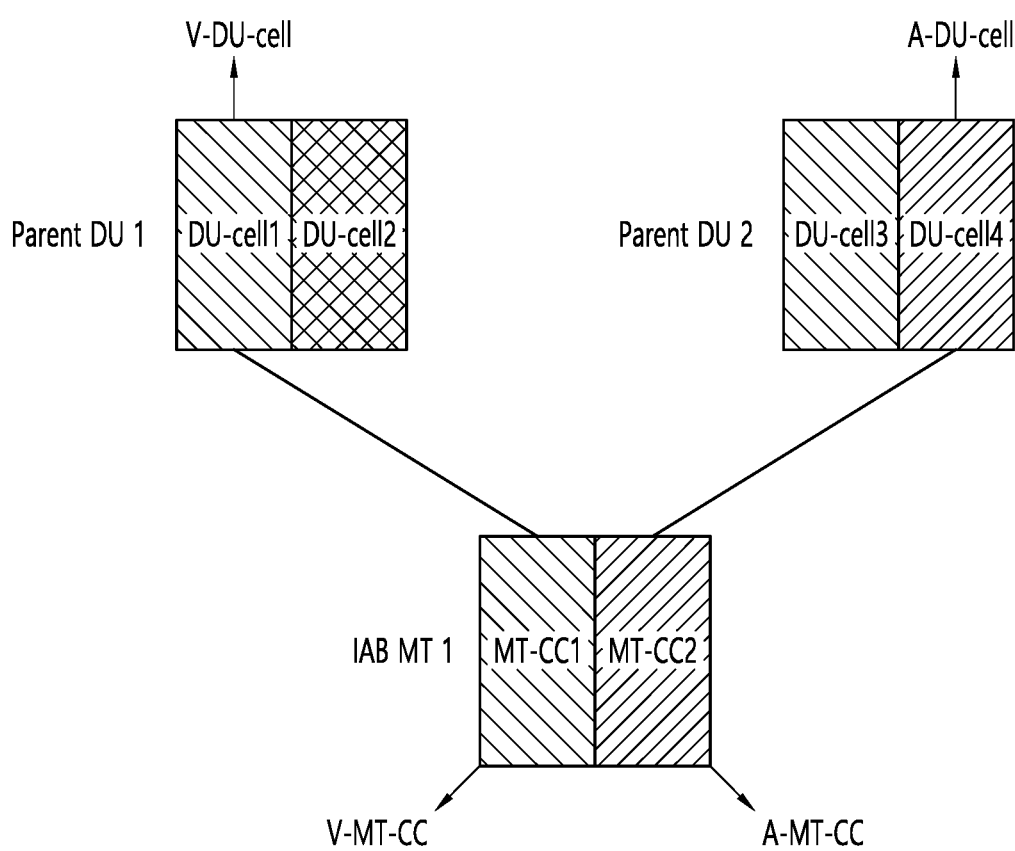
FIG. 26 shows another example of connecting IAB MT1 and two parent DUs.

FIG. 26 shows another example of connecting IAB MT1 and two parent DUs.

Referring to FIG. 26, IAB MT1 consists of MT-CC1 and MT-CC2. Parent DU1 and parent DU2 are DUs in an IAB node independent of each other, and may be connected to the same donor node/CU. MT-CC1 may be connected to DU-cell 1 in parent DU1, and MT-CC2 may be connected to DU-cell 4 in parent DU2. In this case, the link between MT-CC1 and DU-cell 1 and the link between MT-CC2 and DU-cell 4 may operate in the same or adjacent frequency region. From the viewpoint of IAB MT1, the link between MT-CC1 and DU-cell 1 may be referred to as parent link 1, and the link between MT-CC2 and DU-cell 4 may be referred to as parent link 2.

In this case, if the DL/UL directions of the parent link 1 and the parent link 2 are different in a specific time resource, cross-link interference may occur between the two parent links, thereby reducing performance. Therefore, the DL/UL directions of the two parent links shall be aligned with each other at the same time.

For alignment of the DL/UL direction between two parent links from the IAB-MT1 perspective, when the DL/UL direction of the parent link is misaligned, the DL or UL operation of a specific parent link needs to be restricted. At this time, in the present disclosure, for convenience of explanation, two parent IAB DUs of IAB MT1 are divided into a V-DU-cell (Victim DU-cell) and an A-DU-cell (Aggressor DU-cell). In this case, the A-DU-cell performs an operation of restricting its DL/UL operation (i.e., a DL/UL alignment technique) in consideration of the V-DU-cell DL/UL operation.

In FIG. 26, for example, the parent IAB DU1 becomes the V-DU-cell, and the parent IAB DU2 becomes the A-DU-cell. At this time, the MT-CC (i.e., MT-CC1) connected to the V-DU-cell in the IAB MT1 is called V-MT-CC for convenience, and the MT-CC connected to the A-DU-cell (i.e., MT-CC2) is called A-MT-CC for convenience. In addition, from the point of view of IAB MT, the link between the V-MT-CC and the V-DU-cell is called a V-parent link, and the link between the A-MT-CC and the A-DU-cell is called an A-parent link.

In the present disclosure, a situation in which the parent DU1 and the parent DU2 are connected to the same donor node/CU is considered and described. However, even when connected to different donor nodes/CUs, the contents of the present disclosure may be applied.

A. Configuration of V-DU Cell and A-DU Cell

When an IAB MT is connected to two parent DU cells (=parent IAB DU cells), and the two parent DU cells belong to different parent DUs, the two parent DU cells can be respectively a V-DU-cell and an A-DU-cell or an A-DU-cell and a V-DU-cell. At this time, a method of determining whether a specific parent DU cell is a V-DU-cell or an A-DU-cell may be as follows.

Method a. The V-DU-cell may be a parent DU-cell belonging to the MCG among the two CGs (carrier groups) of the IAB MT. The A-DU-cell becomes the parent DU-cell belonging to the SCG among the two CGs of the IAB MT.

Method b. The V-DU-cell may be a parent DU-cell belonging to the SCG among the two CGs (carrier groups) of the IAB MT. The A-DU-cell becomes the parent DU-cell belonging to the MCG among the two CGs of the IAB MT.

Method c. The V-DU-cell and the A-DU-cell may be determined by specific configuration/signaling. For example, the parent DU cell may be explicitly or implicitly configured as the A-DU-cell from the donor node/CU of the parent node DU-cell. Alternatively, the IAB MT may explicitly or implicitly indicate that it is an A-DU-cell. For example, the parent node DU-cell may determine that it is an A-DU-cell as follows.

1. It can be explicitly configured that it is an A-DU-cell.
2. It can determine that it is an A-DU-cell by receiving a configuration to perform the DL/UL alignment technique.
3. By setting/receiving information on the V-DU-cell, V-MT-CC, and/or V-parent link to be considered in order to perform the DL/UL alignment technique, it can be determined that it is an A-DU-cell and that the DL/UL alignment technique should be performed. In this case, 'information on the A-DU-cell to be considered for performing the DL/UL alignment technique' may include, for example, all or part of the following. a) D/U/F resource configuration information in the DU configuration of the V-DU-cell, b) H/S/NA resource configuration information in the DU configuration of the V-DU-cell, c) MT configuration information of V-MT-CC (i.e., D/U/F resource configuration information).

B. Method for Performing DL/UL Alignment Between Two Parent Links

When the IAB MT is connected to two parent DU-cells, and the two parent DU-cells belong to different parent DUs, if the DL/UL directions between two parent links are different in a specific time resource, cross-link interference between the two parent links may occur and cause performance degradation. Therefore, the DL/UL directions of the two parent links at the same time should be aligned with each other.

Hereinafter, when an IAB MT is connected to different parent DUs, methods for aligning DL/UL directions between two parent links are proposed. In this case, one of the following methods may be applied, or a plurality of methods may be combined and applied.

Method a. Method based on DU H/S/NA configuration.

Each DU-cell is configured with H (hard)/S (soft)/NA (not-available, unavailable) information (this may be referred to as attribute information) of DU resources through DU configuration. In this case, the A-DU-cell may restrict its DL/UL operation in consideration of H/S/NA configuration information of the V-DU-cell.

To perform this operation, the A-DU-cell needs to know H/S/NA configuration information of the V-DU-cell. For this, the A-DU-cell may receive information related to H/S/NA configuration of the V-DU-cell from the donor node/CU. Specifically, such information may be as follows.

1. Hard, soft, and non-available (NA) resource information (attribute information) of the V-DU-cell is set/shared.
2. NA resource information of V-DU-cell is set/shared.

When the DU-cell receives the above configurations, recognizing that it is an A-DU-cell that shall restrict DL/UL operation for DL/UL alignment, an operation for DL/UL alignment may be performed. At this time, from the viewpoint of the corresponding A-DU-cell, the DU-cell that the A-DU-cell considers for DL/UL alignment becomes the V-DU-cell.

At this time, specifically, the A-DU-cell may perform an operation for DL/UL alignment as follows.

Method a-1.

In method a-1, one parent DU-cell becomes a V-DU-cell, and another parent DU-cell becomes an A-DU-cell, V-DU-cell is not restricted by DL/UL operation due to A-DU-cell, only the A-DU-cell may be restricted from DL/UL operation due to the V-DU-cell. The A-DU-cell may operate as follows in a resource to which it intends to perform transmission/reception.

The A-DU-cell does not need to perform an operation of restricting its UL/DL for DL/UL alignment because the A-DU-cell does not perform transmission/reception in the NA resource.

The A-DU-cell does not perform an operation of restricting its own DL/UL for DL/UL alignment with respect to the resource for which the V-DU-cell is configured as NA.

The A-DU-cell performs an operation of restricting DL/UL by using i) the method b or method c below for the resource for which the V-DU-cell is set as Hard. Or ii) it may perform its own DL/UL operation without considering the V-DU-cell. In this case, the method d below may be used together.

The A-DU-cell performs an operation of restricting DL/UL by using i) the method b or method c below for the resource for which the V-DU-cell is set as soft. Or ii) it may perform its own DL/UL operation without considering the V-DU-cell. In this case, the method d below may be used together.

Method a-2.

In method a-2, two parent DU-cells each treat itself as an A-DU-cell and the other as a V-DU-cell. That is, assuming that two parent DU-cells are DU-cell 1 and DU-cell 2, DU-cell 1 determines that it is an A-DU-cell and DU-cell 2 is a V-DU-cell and performs an operation for DL/UL alignment, DU-cell 2 may determine that it is an A-DU-cell and DU-cell 1 is a V-DU-cell, and may perform an operation for DL/UL alignment. In this case, it can operate as follows.

The A-DU-cell does not need to perform an operation of restricting its UL/DL for DL/UL alignment because the A-DU-cell does not perform transmission/reception in the NA resource.

The A-DU-cell does not perform an operation of restricting its own UL/DL for DL/UL alignment with respect to the resource for which the V-DU-cell is configured as NA.

For resources that are set as hard and the V-DU-cell is set as soft, the A-DU-cell does not perform an operation of restricting its own UL/DL for DL/UL alignment.

The A-DU-cell performs an operation of restricting DL/UL by using the method b or method c below i) for the resource for which the A-DU-cell is configured as soft and the V-DU-cell is configured as hard. Or ii) it may perform its own DL/UL operation without considering the V-DU-cell. In this case, the method d below may be used together.

The A-DU-cell performs an operation of restricting DL/UL by using the method b or method c below i) for the resource for which the A-DU-cell is configured as hard and the V-DU-cell is configured as hard. Or ii) it may perform its own DL/UL operation without considering the V-DU-cell. In this case, the method d below may be used together.

The A-DU-cell performs an operation of restricting DL/UL by using the method b or method c below i) for the resource for which the A-DU-cell is configured as soft and the V-DU-cell is configured as soft. Or ii) it may perform its own DL/UL operation without considering the V-DU-cell. In this case, the method d below may be used together.

Method b. Method based on DU D/U/F configurations (slot format information).

Each DU-cell receives D/U/F information (slot format information, hereinafter the same) of DU resources through DU configuration. In this case, the A-DU-cell may restrict its DL/UL operation in consideration of D/U/F configuration information of the V-DU-cell.

In order to perform this operation, the A-DU-cell needs to know D/U/F configuration information of the V-DU-cell. To this end, the A-DU-cell may receive D/U/F configuration related information of the V-DU-cell from the donor node/CU.

Upon receiving the above configuration, the DU-cell may recognize that it is an A-DU-cell that needs to restrict DL/UL operation for DL/UL alignment, and may perform an operation for DL/UL alignment. At this time, from the viewpoint of the corresponding A-DU-cell, a DU-cell that the A-DU-cell considers for DL/UL alignment becomes the V-DU-cell.

Characteristically, the operation for DL/UL alignment may be applied only to a resource capable of transmitting/receiving both the A-DU-cell and the V-DU-cell (or having a possibility of performing transmission/reception). For example, the operation for DL/UL alignment may be applied to a resource in which both the A-DU-cell and the V-DU-cell are not set to NA.

At this time, specifically, the A-DU-cell may perform an operation for DL/UL alignment as follows.

For a resource configured as UL for the V-DU-cell, the A-DU-cell does not perform a DL operation when the resource is configured as a DL resource for the A-DU-cell or when the A-DU-cell needs to perform a DL operation.

For a resource configured as a DL for the V-DU-cell, the A-DU-cell does not perform a UL operation when the resource is configured as a UL resource for the A-DU-cell or when the A-DU-cell needs to perform a UL operation.

For a resource configured as Flexible (F) for the V-DU-cell, i) the A-DU-cell does not perform a DL operation when the resource is configured as a DL resource for the A-DU-cell or when the A-DU-cell needs to perform a DL operation. And, when the resource is configured as a UL resource for the A-DU-cell or when the A-DU-cell is necessary to perform a UL operation, the A-DU-cell does not perform the UL operation. Or ii) it may perform its own DL/UL operation without considering the V-DU-cell. In this case, the method d below may be used together.

Figure 27:
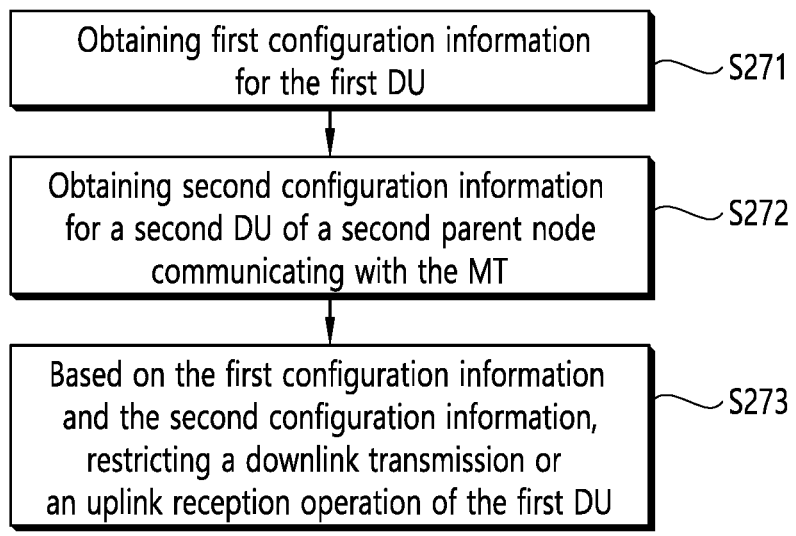
FIG. 27 illustrates an operation method performed by a first DU of a first parent node communicating with an MT of an IAB node in a wireless communication system.

FIG. 27 illustrates an operation method performed by a first DU of a first parent node communicating with an MT of an IAB node in a wireless communication system.

Referring to FIG. 27, a first parent node obtains first configuration information for the first DU (S271), and obtains second configuration information for a second DU of a second parent node communicating with the MT (S272).

The first configuration information may include at least one of slot format information informing whether a specific resource is a downlink symbol, an uplink symbol, or a flexible symbol for the first DU and attribute information informing whether the specific resource is configured as hard, soft, or not available (NA) for the first DU.

The second configuration information may include at least one of slot format information informing whether the specific resource is a downlink symbol, an uplink symbol, or a flexible symbol for the second DU and attribute information informing whether the specific resource is configured as hard, soft, or not available (NA) for the second DU.

The first parent node restricts a downlink transmission or an uplink reception operation of the first DU based on the first configuration information and the second configuration information (S273).

For example, if it is determined that the first DU and the second DU are configured to perform a simultaneous operation not supported by the MT of the IAB node in a specific resource, the first DU may restrict an operation according to the first configuration information.

More specifically, when the second DU is set to be hard or soft for a specific resource, the first DU may restrict an operation according to the first configuration information on the specific resource. For example, when the second DU is configured as an uplink symbol for the specific resource and the first DU is configured as a downlink symbol for the specific resource, the first DU may restrict an operation according to the first configuration information in the specific resource (that is, downlink transmission is not performed on the specific resource). When the second DU is configured as a downlink symbol for the specific resource and the first DU is configured as an uplink symbol for the specific resource, the first DU may restrict an operation according to the first configuration information in the specific resource (that is, uplink reception is not performed on the specific resource). When the second DU is configured as a flexible symbol for the specific resource and the first DU is configured as a downlink symbol or an uplink symbol for the specific resource, the first DU may restrict an operation according to the first configuration information in the specific resource (that is, downlink transmission or uplink reception is not performed on the specific resource).

The method can be said to be a combination of method a and method b described above.

Figure 28:
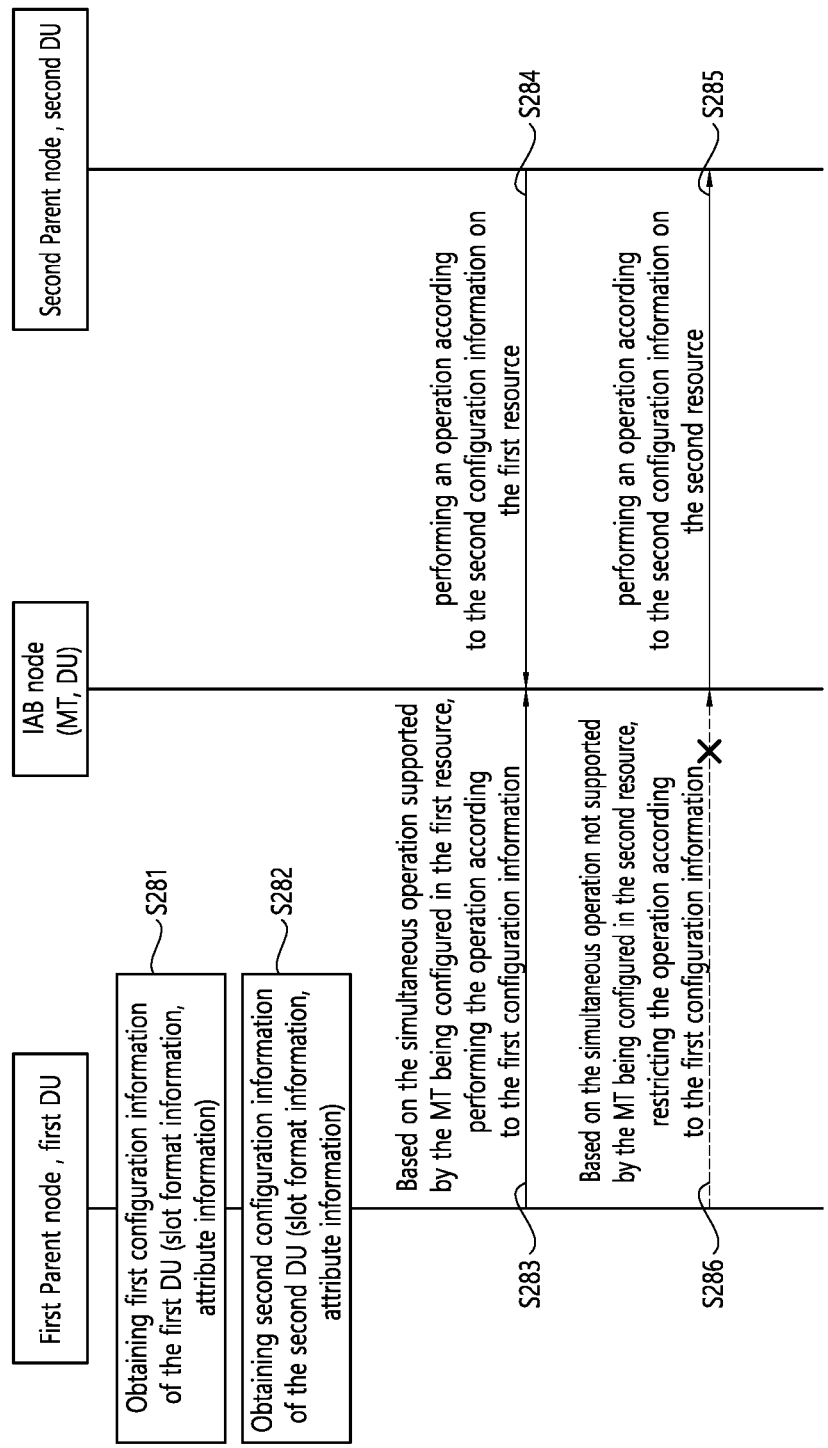
FIG. 28 illustrates a detailed operation method of the first parent node, the IAB node, and the second parent node according to the method of FIG. 27.

FIG. 28 illustrates a detailed operation method of the first parent node, the IAB node, and the second parent node according to the method of FIG. 27.

Referring to FIG. 28, a first parent node includes a first DU. The first parent node obtains first configuration information of the first DU (S281). For example, the first parent node may receive slot format information and attribute information for the first DU from its donor node or a centralized unit (CU).

The first parent node obtains second configuration information of the second DU (S282). For example, the first parent node may receive slot format information and attribute information for the second DU from its donor node or CU.

When the simultaneous operation supported by the MT of the IAB node is configured in the first resource, the first parent node (specifically, the first DU) performs the operation according to the first configuration information (S283).

The second parent node (specifically, the second DU) performs an operation according to the second configuration information on the first resource (S284).

For example, when the first resource is set to downlink in terms of resource direction and hard in terms of attributes for the second DU of the second parent node according to the second configuration information, if the first resource is configured as downlink in the resource direction for the first DU of the first parent node according to the first configuration information, since this is a simultaneous operation supported by the MT, an operation (i.e., downlink transmission) according to the first configuration information is performed.

The second parent node (specifically, the second DU) performs an operation according to the second configuration information on the second resource (S285). When a simultaneous operation not supported by the MT of the IAB node is configured in the second resource, the first parent node (specifically, the first DU) does not perform the operation according to the first configuration information and restricts it (S286).

For example, when the second resource is set to uplink in terms of resource direction and hard in terms of attributes for the second DU of the second parent node according to the second configuration information, if the second resource is configured as downlink in the resource direction for the first DU of the first parent node according to the first configuration information, since this is a simultaneous operation not supported by the MT, an operation according to the first configuration information, i.e., downlink transmission, is restricted (that is, downlink transmission is not performed).

Figure 29:
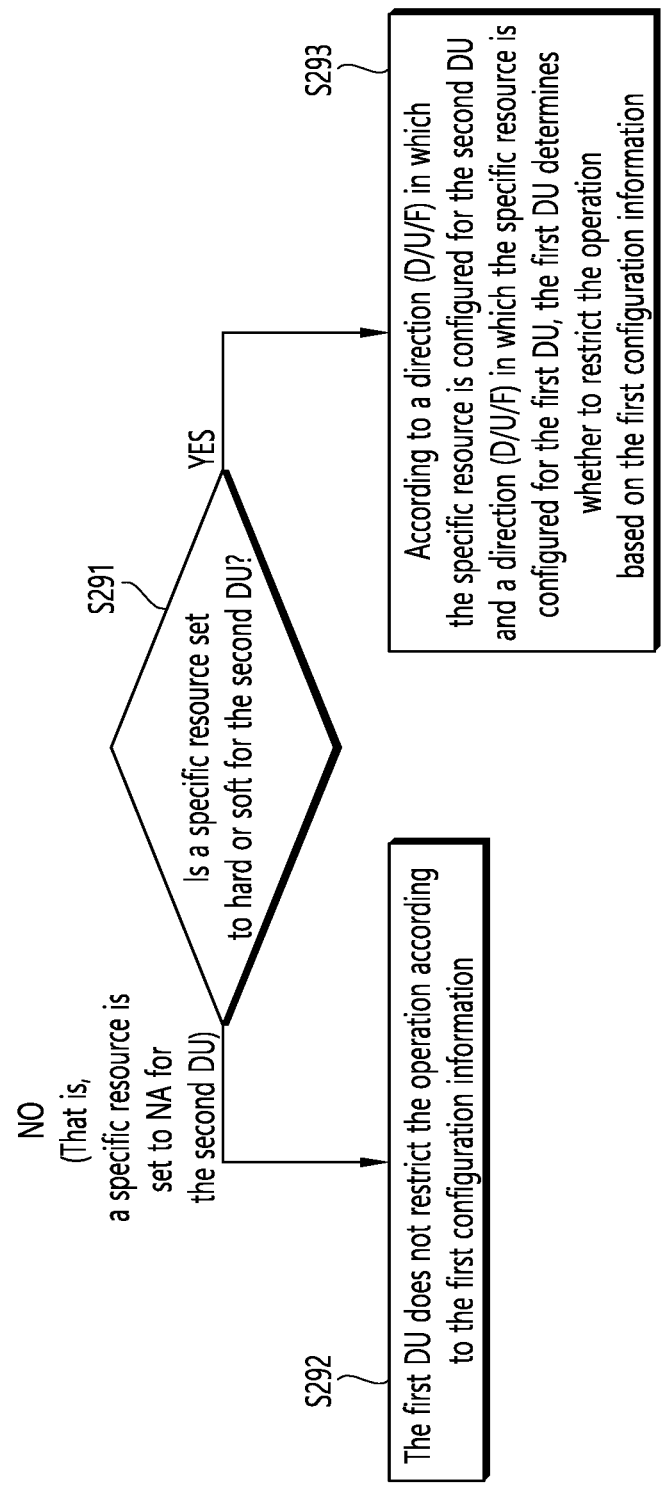
FIG. 29 exemplifies a method of determining whether a first DU of a first parent node will perform an operation according to first configuration information.

FIG. 29 exemplifies a method of determining whether a first DU of a first parent node will perform an operation according to first configuration information.

Referring to FIG. 29, the first DU of the first parent node determines whether a specific resource is set to hard or soft for the second DU of the second parent node (S291). The first DU may determine it based on second configuration information for the second DU.

If the specific resource is set to NA for the second DU, the first DU does not restrict the operation according to the first configuration information (S292).

On the other hand, if the specific resource is set to hard or soft for the second DU, according to a direction (D/U/F) in which the specific resource is configured for the second DU and a direction (D/U/F) in which the specific resource is configured for the first DU, the first DU may determine whether to restrict the operation based on the first configuration information (S293).

For example, when a specific resource is set to soft in terms of attributes and an uplink symbol in terms of resource direction for the second DU, if the specific resource is configured as a downlink symbol for the first DU, the first DU may restrict an operation according to the first configuration information in the specific resource (that is, downlink transmission is not performed in the specific resource).

As another example, when the specific resource is set to hard in terms of attributes and a downlink symbol in terms of resource direction for the second DU, if the specific resource is configured as an uplink symbol for the first DU, the first DU may restrict an operation according to the first configuration information in the specific resource (that is, uplink reception is not performed in the specific resource).

As still another example, when the specific resource is set to hard in terms of attributes and a flexible symbol in terms of resource direction for the second DU, if the specific resource is configured as a downlink symbol or an uplink symbol for the first DU, the first DU may restrict an operation according to the first configuration information in the specific resource (that is, downlink transmission or uplink reception is not performed in the specific resource).

Method c. Method based on MT D/U/F configurations

Each MT-CC receives D/U/F information of MT resources through MT configuration. In this case, the A-DUcell may restrict its DL/UL operation in consideration of the MT D/U/F configuration information of the V-MT-CC.

In order to perform this operation, the A-DU-cell needs to know the MT D/U/F configuration information of the V-MT-CC. For this, the A-DU-cell may receive MT D/U/F configuration related information of the V-MT-CC from the donor node/CU. Alternatively, the A-DU-cell may receive information related to MT D/U/F configuration of the V-MT-CC from the A-MT-CC.

Upon receiving the above configuration, the DU-cell may recognize that the DU-cell itself is an A-DU-cell that needs to restrict DL/UL operation for DL/UL alignment, and may perform an operation for DL/UL alignment. At this time, from the viewpoint of the A-DU-cell, the MT-CC that the A-DU-cell considers for DL/UL alignment becomes the V-MT-CC. The parent DU-cell connected to the V-MT-CC becomes the V-DU-cell.

Characteristically, the operation for DL/UL alignment may be applied only to a resource in which both the A-DU-cell and the V-DU-cell are capable of transmitting/receiving or in which both the A-DU-cell and the V-DU-cell are likely to perform transmission/reception. For example, the operation for DL/UL alignment may be applied to a resource in which neither the A-DU-cell nor the V-DU-cell is set to NA.

At this time, specifically, the A-DU-cell may perform an operation for DL/UL alignment as follows.

With respect to a resource for which the V-MT-CC is configured as UL, the A-DU-cell does not perform a DL operation when the A-DU-cell is configured as a DL resource or needs to perform a DL operation.

With respect to a resource for which the V-MT-CC is configured as DL, the A-DU-cell does not perform a UL operation when the A-DU-cell is configured as a UL resource or needs to perform a UL operation.

With respect to a resource for which the V-MT-CC is configured as F (flexible), the A-DU-cell does not perform a DL operation when the A-DU-cell is configured as a DL resource or needs to perform a DL operation. And the A-DU-cell does not perform a UL operation when the A-DU-cell is configured as a UL resource or needs to perform a UL operation. Or ii) it may perform its own DL/UL operation without considering V-MT-CC. In this case, the method d below may be used together.

Method d. A method based on priority rule

The IAB MT may be connected to two parent DU-cells through two MT-CCs, and the two parent DU-cells may belong to different parent DUs, respectively. At this time, when the two MT-CCs are configured to or scheduled to perform DL reception and DU transmission (or UL transmission and DL reception) in a same resource (in a same time resource), respectively, each MT-CC may operate as follows.

Method d-1. The A-MT-CC does not operate, and the V-MT-CC performs a scheduled transmission/reception operation.

Method d-2. The V-MT-CC does not operate, and the A-MT-CC performs a scheduled transmission/reception operation.

Method d-3. The DL signal will be transmitted regardless of the operation of the MT-CC. Accordingly, the MT-CC scheduled for DL reception performs DL reception, and the MT-CC scheduled for UL transmission does not perform UL transmission.

For example, the two MT-CCs and the two parent node DU-cells can determine and perform an operation when the DL/UL directions do not match through the following process.

1) The parent DU-cell determines resources that can operate without restrictions and resources that may require restrictions based on H/S/NA resource information of other parent DU-cells of the IAB MT.
2) For resources that may require restrictions by 1), the parent DU-cell determines resources on which it can transmit/receive and resources on which it cannot perform transmission/reception, based on D/U/F resource information of other parent DU-cells of IAB MT.
3) When it is necessary to perform DL and UL or UL and DL operations with two parent links, respectively (scheduled case), two MT-CCs in the IAB MT determine whether their own transmission/reception is possible based on their DL/UL operation and/or whether they are A-MT-CC/V-MT-CC.

Figure 30:
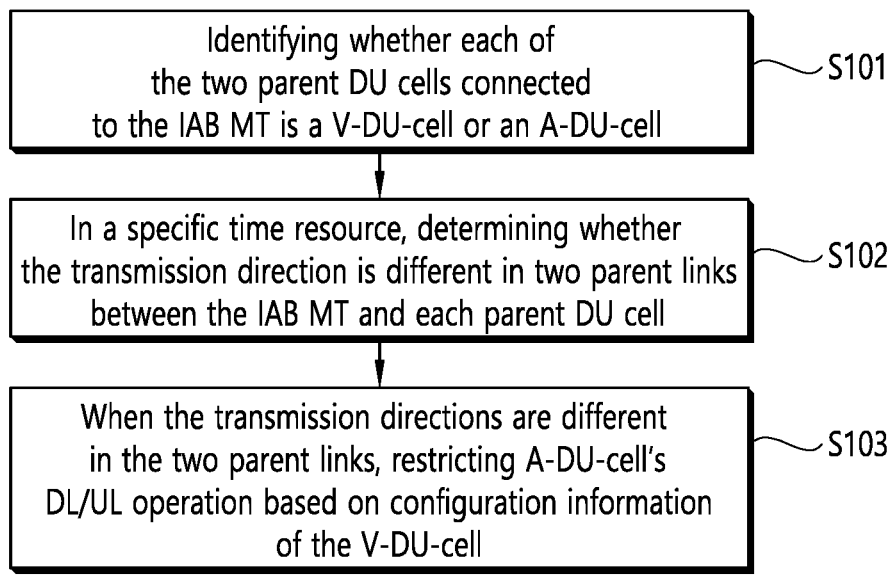
FIG. 30 is an example of an operation method of an IAB node.

FIG. 30 is an example of an operation method of an IAB node.

It is identified whether each of the two parent DU cells connected to the IAB MT is a V-DU-cell or an A-DU-cell (S101). The specific identification method has been described in 'A. Configuration of the V-DU cell and the A-DU cell'. For example, as described above, the parent DU cell itself may be explicitly or implicitly configured to be an A-DU-cell from the donor node/CU of the parent DU cell.

In a specific time resource, the A-DU-cell determines whether the transmission direction is different in two parent links between the IAB MT and each parent DU cell (S102), when the transmission directions are different in the two parent links, the A-DU-cell may restrict its DL/UL operation based on configuration information of the V-DU-cell (S103). A specific example of operation restriction has been described in 'B. Method for performing DL/UL alignment between two parent links'.

Figure 31:
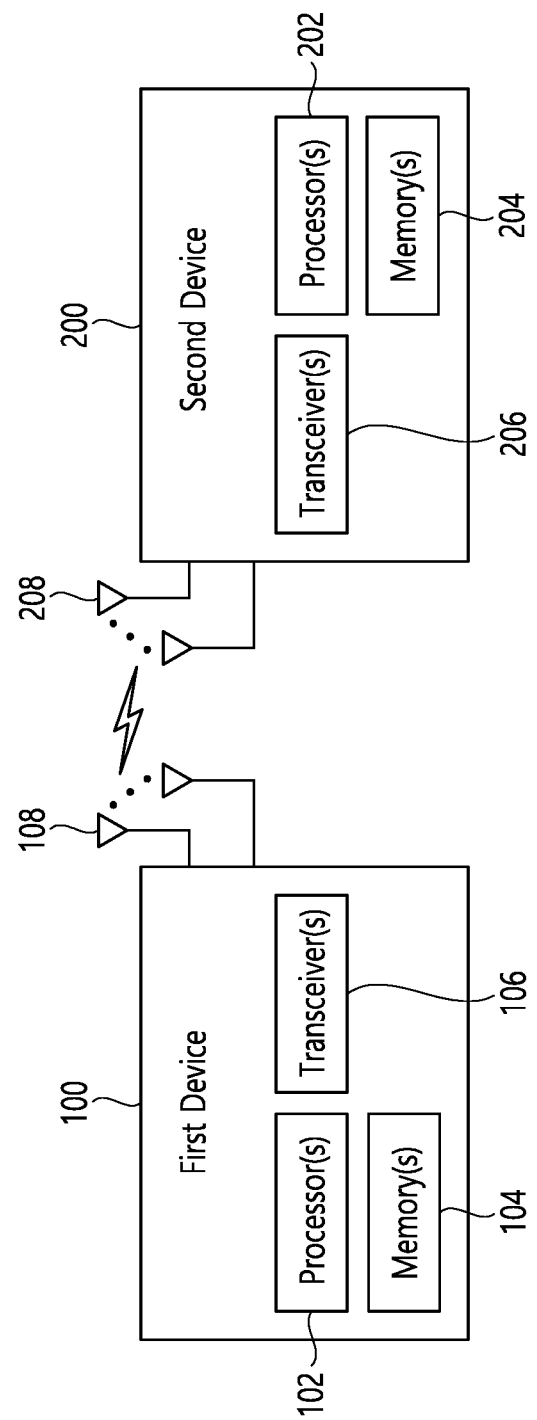
FIG. 31 illustrates an example of a wireless communication device for implementing the present disclosure.

FIG. 31 illustrates a wireless device applicable to the present specification.

Referring to FIG. 31, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202.

The one or more processors 102 and 202 may be implemented with at least one computer readable medium (CRM) including instructions to be executed by at least one processor.

That is, at least one computer readable medium (CRM) having an instruction to be executed by at least one processor to perform operations includes, obtaining first configuration information for a first distributed unit (DU) of a first parent node communicating with a mobile terminal (MT) of the IAB node, obtaining second configuration information for a second DU of a second parent node communicating with the MT and restricting a downlink transmission or uplink reception operation of the first DU based on the first configuration information and the second configuration information.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 32:
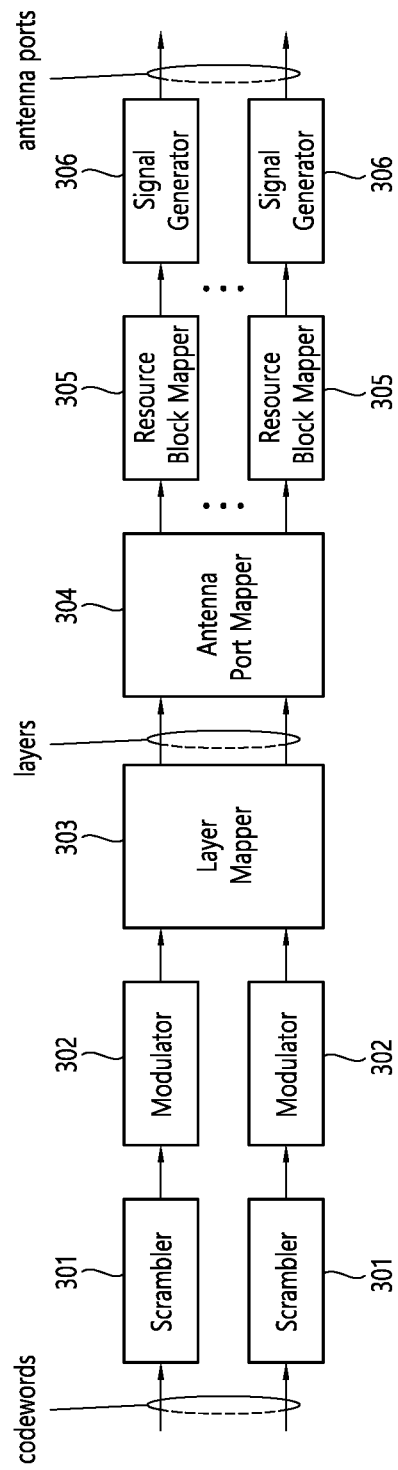
FIG. 32 shows an example of the structure of a signal processing module.

FIG. 32 shows an example of a structure of a signal processing module. Herein, signal processing may be performed in the processors 102 and 202 of FIG. 31.

Referring to FIG. 32, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 33:
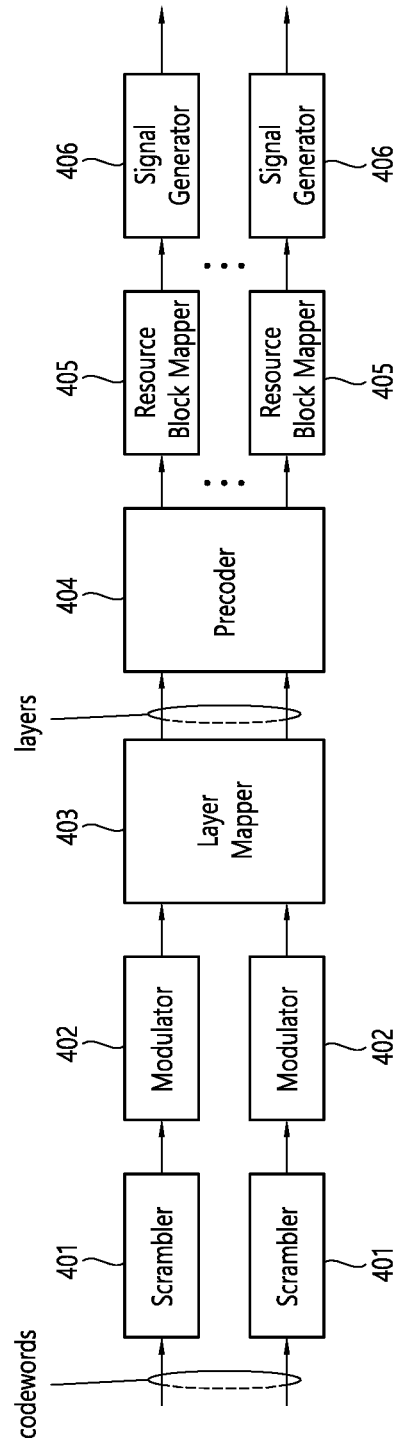
FIG. 33 shows another example of the structure of a signal processing module in a transmission device.

FIG. 33 shows another example of a structure of a signal processing module in a transmitting device. Herein, signal processing may be performed in a processor of a UE/BS, such as the processors 102 and 202 of FIG. 31.

Referring to FIG. 33, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N× M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 34:
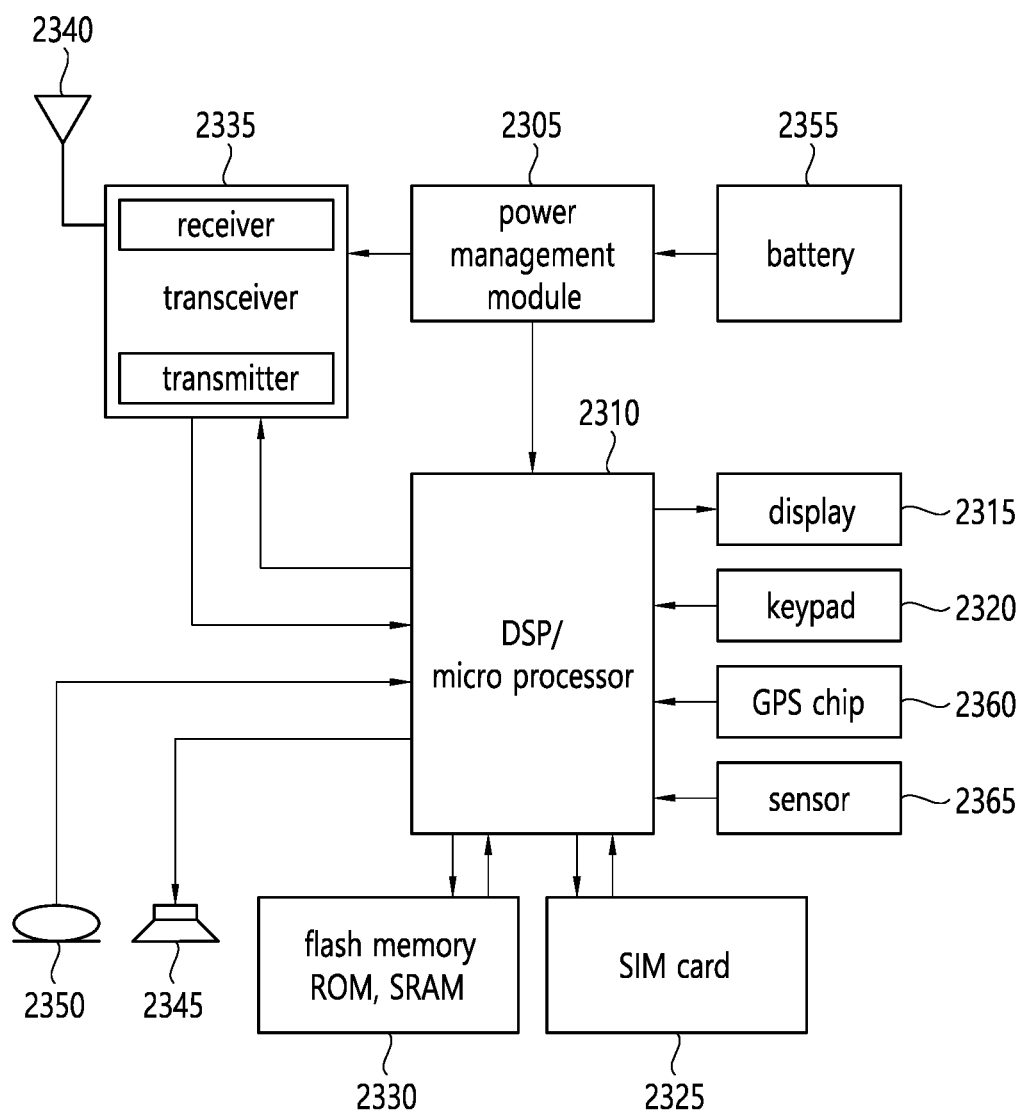
FIG. 34 illustrates an example of a wireless communication device according to an embodiment of the present disclosure.

FIG. 34 illustrates an example of a wireless communication device according to an implementation example of the present disclosure.

Referring to FIG. 34, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 34 may be the processors 102 and 202 in FIG. 31.

The memory 2330 is connected to the processor 2310 and stores information related to operations of the processor. The memory may be located inside or outside the processor and connected to the processor through various techniques such as wired connection and wireless connection. The memory 2330 in FIG. 34 may be the memories 104 and 204 in FIG. 31.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 34 may be the transceivers 106 and 206 in FIG. 31.

Although not shown in FIG. 34, various components such as a camera and a universal serial bus (USB) port may be additionally included in the UE. For example, the camera may be connected to the processor 2310.

FIG. 34 is an example of implementation with respect to the UE and implementation examples of the present disclosure are not limited thereto. The UE need not essentially include all the components shown in FIG. 34. That is, some of the components, for example, the keypad 2320, the GPS chip 2360, the sensor 2365 and the SIM card 2325 may not be essential components. In this case, they may not be included in the UE.

Figure 35:
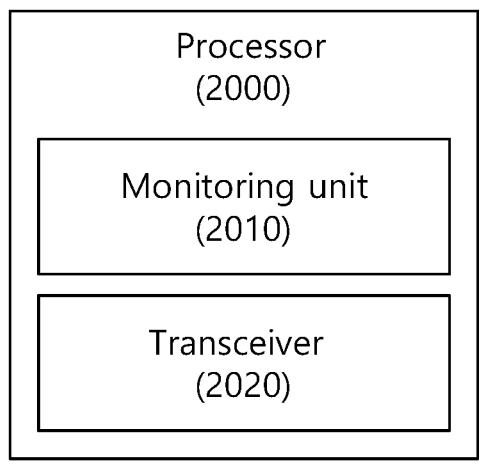
FIG. 35 shows an example of a processor 2000.

FIG. 35 shows an example of a processor 2000.

Referring to FIG. 35, the processor 2000 may be included in the first parent node, and may include a monitoring unit 2010 and a transceiver 2020. The processor 2000 may execute the methods described with reference to FIGS. 22 to 28. For example, the processor 2000 may obtain the first configuration information for the first DU and the second configuration information for the second DU of a second parent node communicating with the MT through the monitoring unit 2010. In addition, the downlink transmission or uplink reception operation of the first DU may be restricted through the transceiver 2020 based on the first configuration information and the second configuration information. The processor 2000 may be an example of the processors 102 and 202 of FIG. 31.

Figure 36:
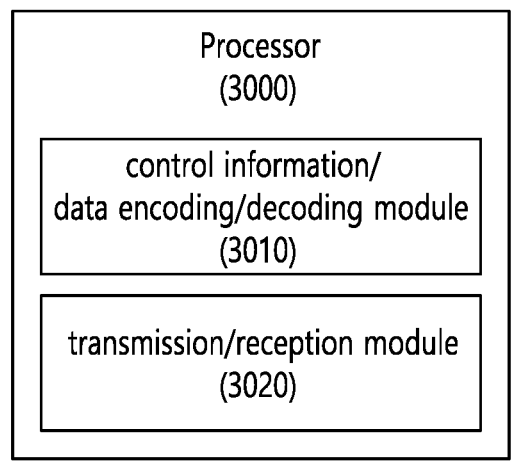
FIG. 36 shows an example of a processor 3000.

FIG. 36 shows an example of a processor 3000.

Referring to FIG. 36, the processor 3000 may be included in a donor node or CU connected to the first parent node and the second parent node, and may include a control information/data encoding/decoding module 3010 and a transmission/reception module 3020. The processor 3000 may execute the methods described with reference to FIGS. 22 to 28. For example, the processor 3000 generates first configuration information for the first DU of the first parent node through the control information/data encoding/decoding module 3010 and generates the second configuration information of the second DU of the second parent node communicating with the MT of the IAB node. And the first and second configuration information may be transmitted to the first parent node through the transmission/reception module 3020. The processor 3000 may be an example of the processors 102 and 202 of FIG. 31.

Figure 37:
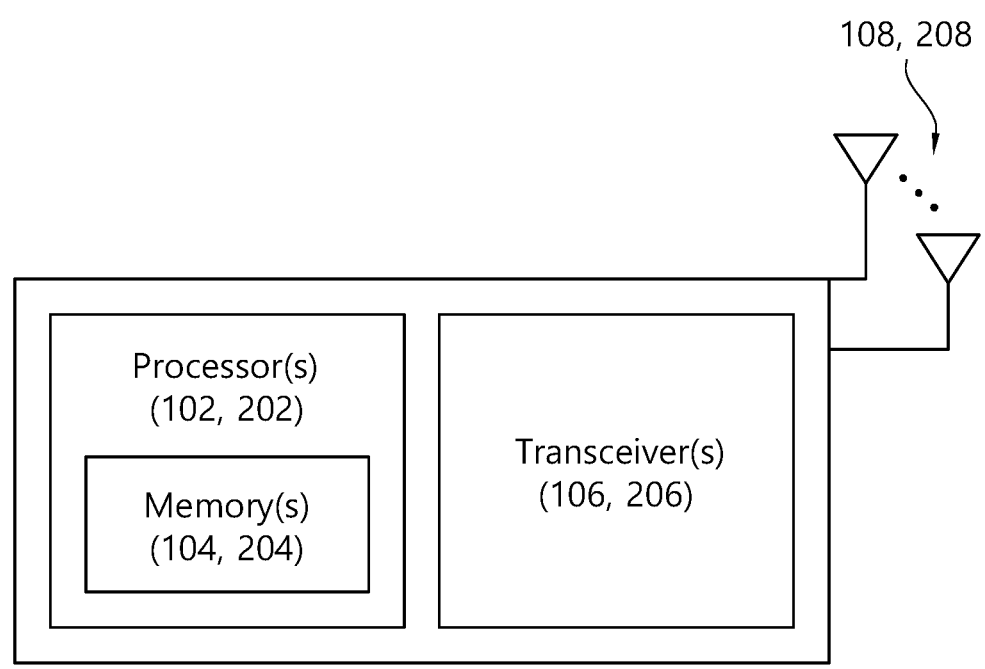
FIG. 37 shows another example of a wireless device.

FIG. 37 shows another example of a wireless device.

Referring to FIG. 37, the wireless device may include one or more processors 102 and 202, one or more memories 104 and 204, one or more transceivers 106 and 206 and one or more antennas 108 and 208.

The example of the wireless device described in FIG. 37 is different from the example of the wireless described in FIG. 31 in that the processors 102 and 202 and the memories 104 and 204 are separated in FIG. 31 whereas the memories 104 and 204 are included in the processors 102 and 202 in the example of FIG. 37. That is, the processor and the memory may constitute one chipset.

Figure 38:
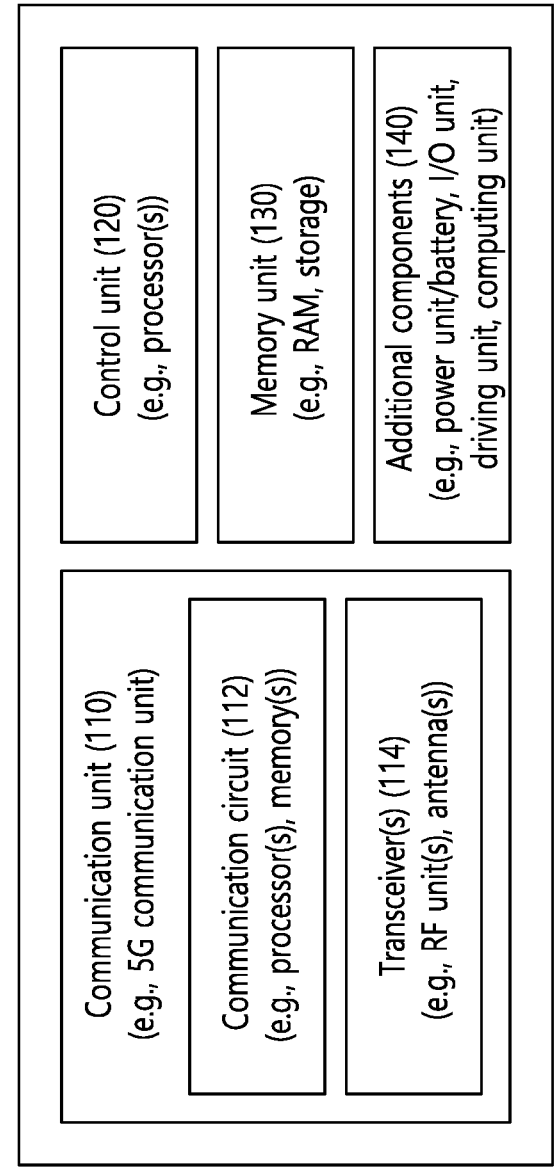
FIG. 38 shows another example of a wireless device applied to the present specification.

FIG. 38 shows another example of a wireless device applied to the present specification. The wireless device may be implemented in various forms according to a use-case/service.

Referring to FIG. 38, wireless devices 100 and 200 may correspond to the wireless devices 100 and 200 of FIG. 37 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 37. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 40), the vehicles (100b-1 and 100b-2 of FIG. 40), the XR device (100c of FIG. 40), the hand-held device (100d of FIG. 40), the home appliance (100e of FIG. 40), the IoT device (100f of FIG. 40), a digital broadcast UE, a hologram device, a public safety device, an MTC device, a medicine device, a fintech device (or a finance device), a security device, a climate/environment device, the AI server/device (400 of FIG. 40), the BSs (200 of FIG. 40), a network node, etc. The wireless device may be used in a mobile or fixed place according to a use-example/service.

In FIG. 38, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 39:
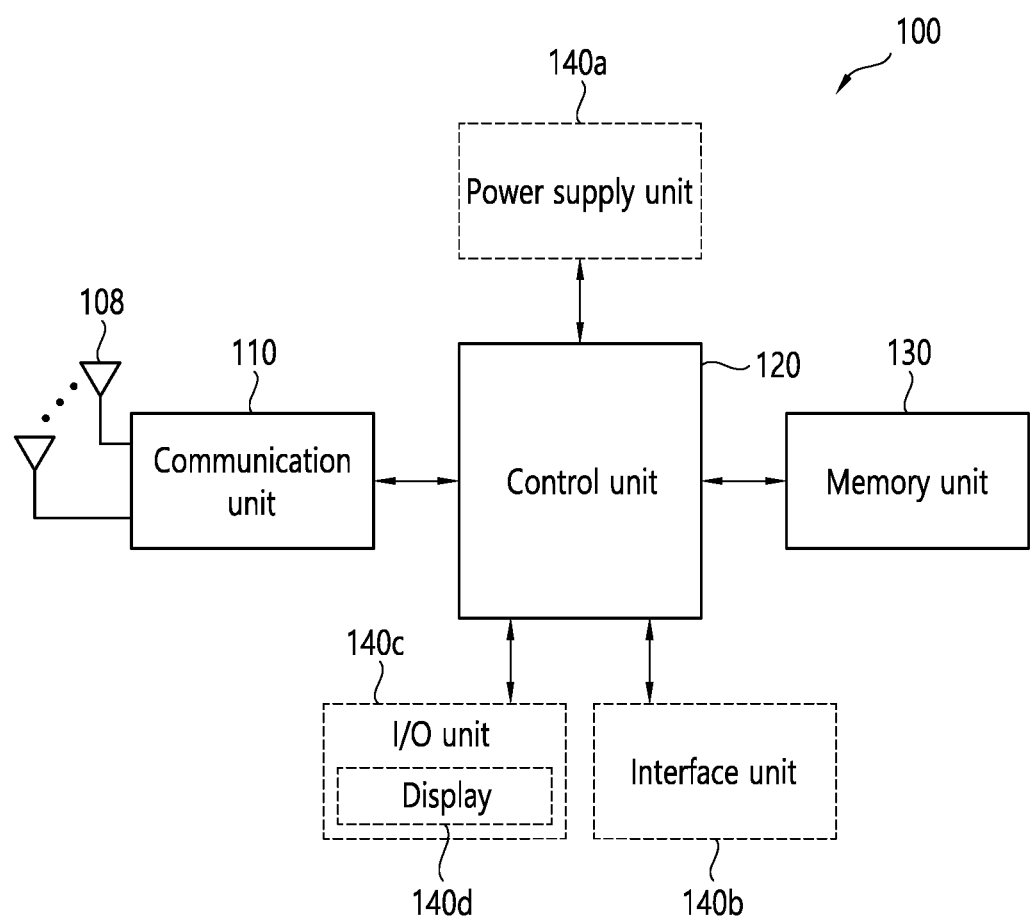
FIG. 39 illustrates a hand-held device applied to the present specification.

FIG. 39 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 39, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 38.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 40:
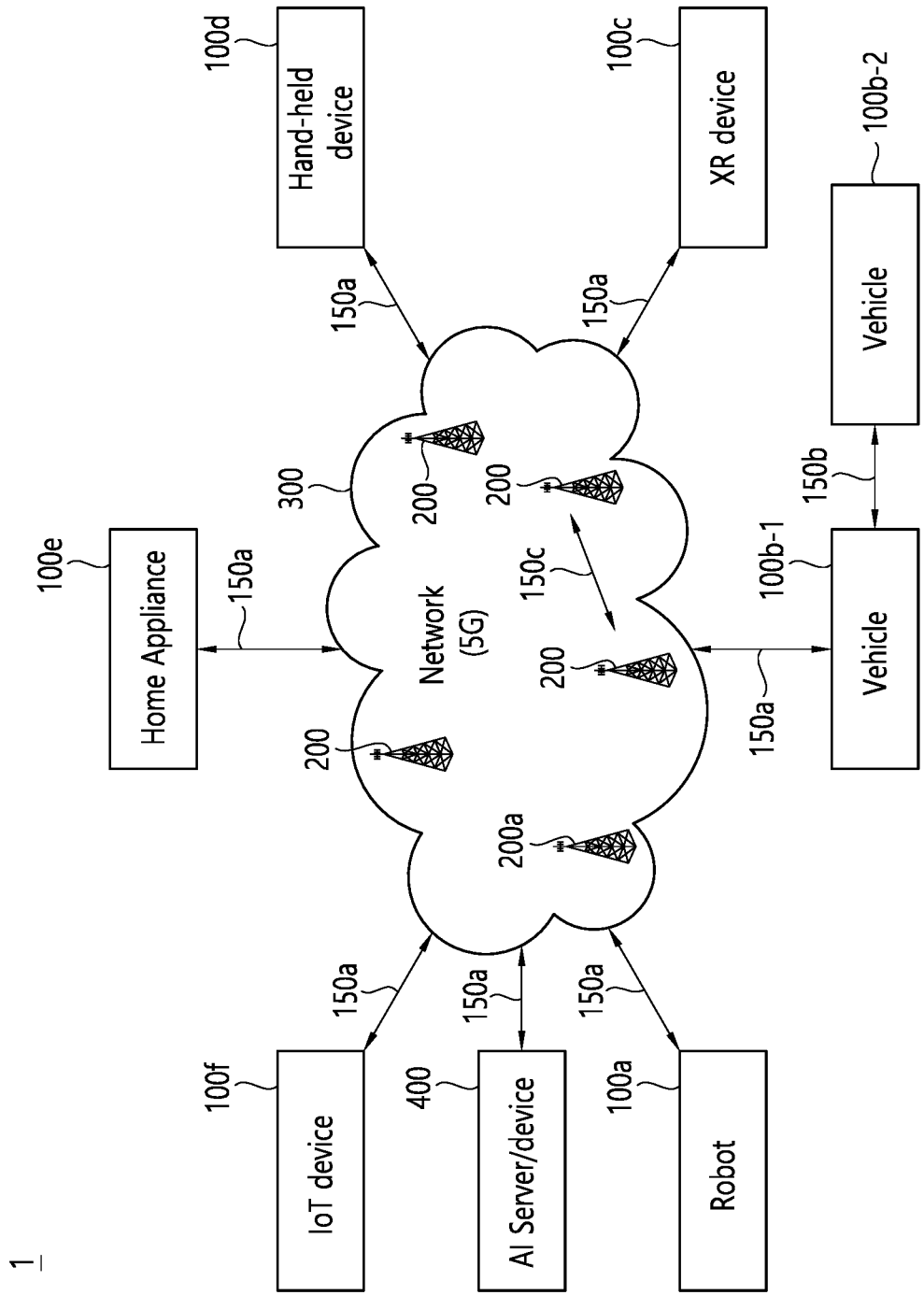
FIG. 40 illustrates a communication system 1 applied to the present specification.

FIG. 40 illustrates a communication system 1 applied to the present specification.

Referring to FIG. 40, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHZ, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 41:
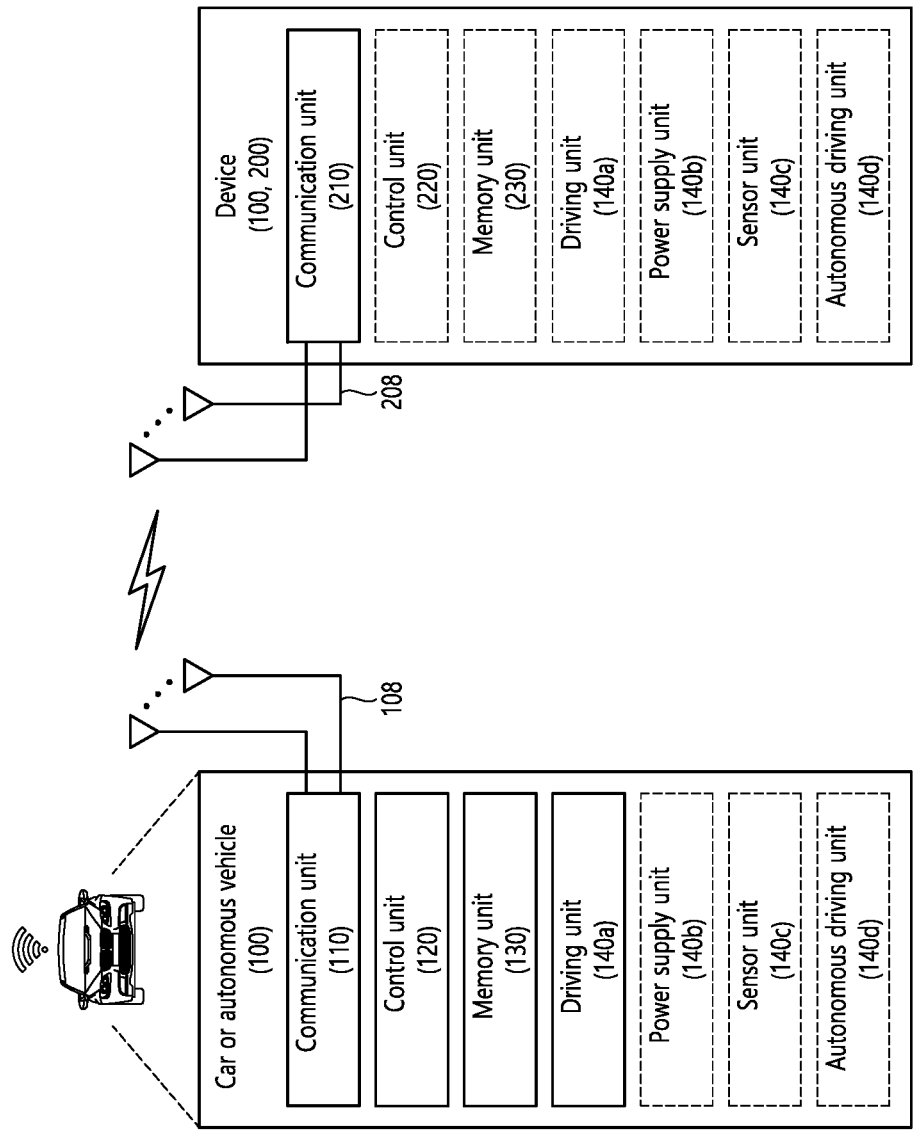
FIG. 41 illustrates a vehicle or an autonomous vehicle applicable to the present specification.

FIG. 41 illustrates a vehicle or an autonomous vehicle applicable to the present specification. The vehicle or autonomous vehicle may be implemented by a mobile robot, a car, a train, a manned/unmanned Aerial Vehicle (AV), a ship, etc.

Referring to FIG. 41, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d respectively correspond to the blocks 110/130/140 of FIG. 41.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method, comprising:
    using, by an integrated access and backhaul (IAB) node, one link of the IAB node for connectivity with a first parent node which is included in a master cell group (MCG); and
    using, by the IAB node, other link of the IAB node for connectivity with a second parent node which is included in a secondary cell group (SCG);
    wherein the IAB node includes a distributed unit (DU) and a mobile terminal (MT),
    wherein the MT of the IAB node is not capable of simultaneous transmission and reception, and
    wherein based on that i) the MT of the IAB node is scheduled to simultaneously transmit and receive on the first parent node and the second parent node and ii) a specific resource that can be used for one of an uplink and a downlink is configured by both the first parent node and the second parent node, the MT of the IAB node operates according to a scheduling from the first parent node.

2. An integrated access and backhaul (IAB) node, the IAB node comprising:
    at least one transceiver;
    at least one memory; and
    at least one processor operatively coupled with the at least one memory and the at least one transceiver,
    wherein the at least one memory stores instructions that, based on being executed by the at least one processor, cause the at least one processor to perform operations comprising:
    using one link of the IAB node for connectivity with a first parent node which is included in a master cell group (MCG); and
    using other link of the IAB node for connectivity with a second parent node which is included in a secondary cell group (SCG),
    wherein the IAB node includes a distributed unit (DU) and a mobile terminal (MT),
    wherein the MT of the IAB node is not capable of simultaneous transmission and reception, and
    wherein based on that i) the MT of the IAB node is scheduled to simultaneously transmit and receive on the first parent node and the second parent node and ii) a specific resource that can be used for one of an uplink and a downlink is configured by both the first parent node and the second parent node, the MT of the IAB node operates according to a scheduling from the first parent node.

3. An apparatus of an integrated access and backhaul (IAB) node, the apparatus comprising:
    at least one memory; and
    at least one processor operatively coupled with the at least one memory,
    wherein the at least one memory stores instructions that, based on being executed by the at least one processor, cause the at least one processor to perform operations comprising:
    using one link of the IAB node for connectivity with a first parent node which is included in a master cell group (MCG); and
    using other link of the IAB node for connectivity with a second parent node which is included in a secondary cell group (SCG),
    wherein the IAB node includes a distributed unit (DU) and a mobile terminal (MT),
    wherein the MT of the IAB node is not capable of simultaneous transmission and reception, and
    wherein based on that i) the MT of the IAB node is scheduled to simultaneously transmit and receive on the first parent node and the second parent node and ii) a specific resource that can be used for one of an uplink and a downlink is configured by both the first parent node and the second parent node, the MT of the IAB node operates according to a scheduling from the first parent node.

* * * * *